(12) United States Patent
Oyama et al.

(10) Patent No.: US 11,273,822 B2
(45) Date of Patent: Mar. 15, 2022

(54) PARKING ASSIST APPARATUS

(71) Applicants: TOYOTA JIDOSHA KABUSHIKI KAISHA, Toyota (JP); AISIN CORPORATION, Kariya (JP)

(72) Inventors: Keisuke Oyama, Nisshin (JP); Yuki Minase, Toyota (JP); Shinya Sannodo, Toyota (JP); Miyuki Omori, Nagoya (JP); Norio Imai, Anjo (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 232 days.

(21) Appl. No.: 16/445,956

(22) Filed: Jun. 19, 2019

(65) Prior Publication Data
US 2020/0001864 A1 Jan. 2, 2020

(30) Foreign Application Priority Data

Jun. 27, 2018 (JP) .............................. JP2018-121529

(51) Int. Cl.
| B60W 30/06 | (2006.01) |
|---|---|
| B60W 10/04 | (2006.01) |
| B60W 10/18 | (2012.01) |
| B60W 10/20 | (2006.01) |
| B60W 50/14 | (2020.01) |

(52) U.S. Cl.
CPC ............ *B60W 30/06* (2013.01); *B60W 10/04* (2013.01); *B60W 10/18* (2013.01); *B60W 10/20* (2013.01); *B60W 50/14* (2013.01); *B60W 2540/16* (2013.01)

(58) Field of Classification Search
CPC ...... B60W 30/06; B60W 10/04; B60W 10/20; B60W 50/14; B60W 10/18; B60W 2540/16
See application file for complete search history.

(56) References Cited

U.S. PATENT DOCUMENTS

2017/0259850 A1* 9/2017 Yamashita ............. G08G 1/168

FOREIGN PATENT DOCUMENTS

| JP | 2004-284530 A | 10/2004 |
|---|---|---|
| JP | 2006-321291 A | 11/2006 |
| JP | 2012-76551 A | 4/2012 |
| JP | 2015-003565 A | 1/2015 |
| JP | 2018-135028 A | 8/2018 |

* cited by examiner

*Primary Examiner* — Brian P Sweeney
(74) *Attorney, Agent, or Firm* — Sughrue Mion, PLLC

(57) ABSTRACT

A parking assist apparatus is configured to execute parking assist control including steering angle automatic control, driving force automatic control and braking force automatic control, the parking assist apparatus being programmed to notify an occupant of an operation request requesting a driving operation of the vehicle to be performed for the parking assist control; and terminate the parking assist control and notify the occupant that the parking assist control is terminated when the driving operation corresponding to the operation request has not been performed by the occupant within a predetermined period.

4 Claims, 10 Drawing Sheets

PARKING ASSIST APPARATUS

CLAIM OF PRIORITY

The present application claims priority from Japanese patent application JP 2018-121529 filed on Jun. 27, 2018, the content of which is hereby incorporated by reference into this application.

BACKGROUND

1. Technical Field

The present disclosure relates to a parking assist apparatus configured to execute parking assist control for parking a vehicle in a predetermined place or moving a parked vehicle from a parking space.

2. Description of the Related Art

Hitherto, there has been proposed a parking assist apparatus configured to detect a peripheral state of a vehicle by using vehicle peripheral sensors when the vehicle is parked at a predetermined position, and execute steering angle automatic control for changing a steering angle of the vehicle in such a manner that the vehicle moves/travels along a target path set based on the detected peripheral state (see Japanese Patent Application Laid-open No. 2004-284530).

The inventors of the present application consider a parking assist apparatus configured to execute parking assist control including driving force automatic control and braking force automatic control in addition to steering angle automatic control when a vehicle is parked at a predetermined region in a parking space or the vehicle exits from the parking space. Even in such a parking assist apparatus, the driver needs to perform some operations by himself/herself. One example of such operations is a switching operation of a shift lever. Therefore, it is conceivable to request the driver to perform the switching operation of the shift lever according to the following control flow.

When a vehicle has reached a position on a target path where a travel direction of the vehicle is switched from a forward direction to a reverse direction or vice versa, the parking assist apparatus executes braking force automatic control to stop the vehicle. The above-mentioned position on the target path is a position where the vehicle is temporarily stopped to causes the driver to switch the position of the shift lever, and hereinafter is simply referred to as "travel-direction switching position".

The parking assist apparatus requests the driver to perform the switching operation of the shift lever by using a screen display and/or a sound. Hereinafter, such a request is referred to as "operation request". However, in the above-mentioned situation, for example, when the driver desires to terminate(cancel) the parking assist control and move the vehicle to another place, the driver does not perform the switching operation of the shift lever. In this case, the parking assist apparatus keeps the vehicle in a stopped state by the braking force automatic control while waiting for a response of the driver with respect to the operation request. Therefore, in order for the driver to move the vehicle to another place, it is necessary to perform a specific operation (for example, a switch operation and a touch panel operation) for terminating/canceling the parking assist control. The driver feels such a specific operation inconvenient.

SUMMARY

The present disclosure provides a parking assist apparatus configured to execute parking assist control including driving force automatic control and braking force automatic control in addition to steering angle automatic control, and terminate the parking assist control according to whether or not an occupant has performed an operation (response) with respect to an operation request.

A parking assist apparatus according to one embodiment (hereinafter sometimes referred to as "apparatus of one embodiment") includes: an information acquisition device (81, 82, 83) configured to acquire vehicle-surroundings information which is information on surroundings of a vehicle, the vehicle-surroundings information including information on an object present in the surroundings of the vehicle and information on a separation line on a road surface in the surroundings of the vehicle; a path determination module (10X) programmed to determine, based on the vehicle-surroundings information, a target region, which is a region in which the vehicle is to occupy when the vehicle completes parking or exiting from a parking space, and determine, as a target path (Ltgt), a path along which the vehicle is to be moved from a position of the vehicle at a current point in time to the target region; and a parking assist module (10Y) programmed to execute parking assist control in such a manner that the vehicle moves the position of the vehicle at the current point in time to the target region along the determined target path, the parking assist control including steering angle automatic control for changing a steering angle of the vehicle, driving force automatic control for controlling a driving force of the vehicle and braking force automatic control for controlling a braking force of the vehicle.

Further, in a period from a first time point on and after a point in time at which the target path has been determined (Step 325) until a second time point on and after a point in time at which the vehicle has reached the target region (Step 510), the parking assist module is programmed to: notify an occupant of an operation request requesting a driving operation of the vehicle to be performed by the occupant for the parking assist control (Step 610); monitor whether or not the driving operation corresponding to the operation request has been performed by the occupant within a predetermined period after the notification of the operation request (Step 615, Step 630); and when the driving operation corresponding to the operation request has not been performed by the occupant within the predetermined period (Step 615: No, Step 635: Yes, Step 1110: Yes), terminate the parking assist control and notify the occupant that the parking assist control is terminated (Step 370, Step 430, Step 530).

The apparatus of one embodiment having such a configuration requests the occupant to perform the driving operation. This driving operation is an operation to be performed by the occupant for the parking assist control. When the occupant has not performed the driving operation within the predetermined period, the apparatus terminates the parking assist control, and notifies the occupant that the parking assist control is terminated. In this manner, the apparatus can continue or terminate (cancel) the parking assist control according to whether or not the occupant has performed the driving operation (response) with respect to the operation request. The occupant can terminate the parking assist control only by maintaining a state in which he/she does not perform the driving operation corresponding to the operation request for the predetermined period without performing a specific operation.

According to one aspect of the apparatus of one embodiment, in a case where the driving operation corresponding to the operation request has not been performed by the occupant within the predetermined period (Step 615: No), the parking assist module is programmed to: when an elapsed time from a point in time at which the occupant is notified of the operation request becomes equal to or longer than a first predetermined time threshold (Tm1) (Step 620: Yes), alert the occupant that the driving operation corresponding to the operation request has not yet been performed without terminating the parking assist control (Step 625); and when the elapsed time becomes equal to or longer than a second predetermined time threshold (Tm2) which is longer than the first predetermined time threshold (Step 635: Yes), terminate the parking assist control and notify the occupant that the parking assist control is terminated.

The apparatus according to this aspect alerts the occupant without terminating the parking assist control when the elapsed time from the point in time at which the occupant is notified of the operation request (hereinafter, referred to as "operation request time point") becomes equal to or longer than the first predetermined time threshold. The occupant performs the driving operation corresponding to the operation request at the point in time at which the occupant receives the alert, and therefore, it is possible to continue the parking assist control. For example, although the occupant desires to continue the parking assist control, even if the occupant cannot perform the driving operation corresponding to the operation request quickly, the parking assist control is not immediately terminated (cancelled). The occupant need not to again perform an operation for requesting the parking assist. Therefore, it is possible to reduce the possibility that the occupant feels inconvenient. On the other hand, even though the occupant receives the alert, if the elapsed time from the operation request time point reaches the second time threshold without performing the driving operation corresponding to the operation request, it is likely that the occupant desires to terminate the parking assist control. In such a situation, the apparatus according to this aspect terminates the parking assist control. As described above, the apparatus according to this aspect can terminate the parking assist control in accordance with the elapsed time from the operation request time point.

According to one aspect of the apparatus of one embodiment, in a case where there is a stop position (Psw, Ptgt) for stopping the vehicle in the period from the first time point until the second time point, the parking assist module is programmed to notify the occupant of a change of a position of a shift lever as the operation request when the vehicle stops at the stop position (Step 420, Step 515).

The apparatus according to this aspect is configured to, when the vehicle reaches the stop position (for example, a travel-direction switching position or target region) and is in a stopped state, notify the occupant of the change of the position of the shift lever as the operation request. The apparatus according to this aspect can terminate the parking assist control according to whether or not the change of the shift lever position has been performed.

In the above description, in order to facilitate understanding of the present disclosure, a name and/or reference numeral used in the embodiment of the present disclosure described later is enclosed in parentheses and assigned to each of the constituent features corresponding to the embodiment. However, each of the constituent features is not limited to the embodiment defined by the name and/or reference numeral. Further features relating to the above one or more aspects of the apparatus become apparent from the description herein and the accompanying drawings. Problems, configurations, and effects other than those described above become apparent from the following description of the embodiment.

DESCRIPTION OF THE EMBODIMENTS

Now, referring to the accompanying drawings, a description is given of an embodiment of the present disclosure. The accompanying drawings are illustrations of a specific embodiment, but those illustrations are examples to be used for the understanding of the embodiment, and are not to be used to limit the interpretation of the present disclosure.

Figure 1:
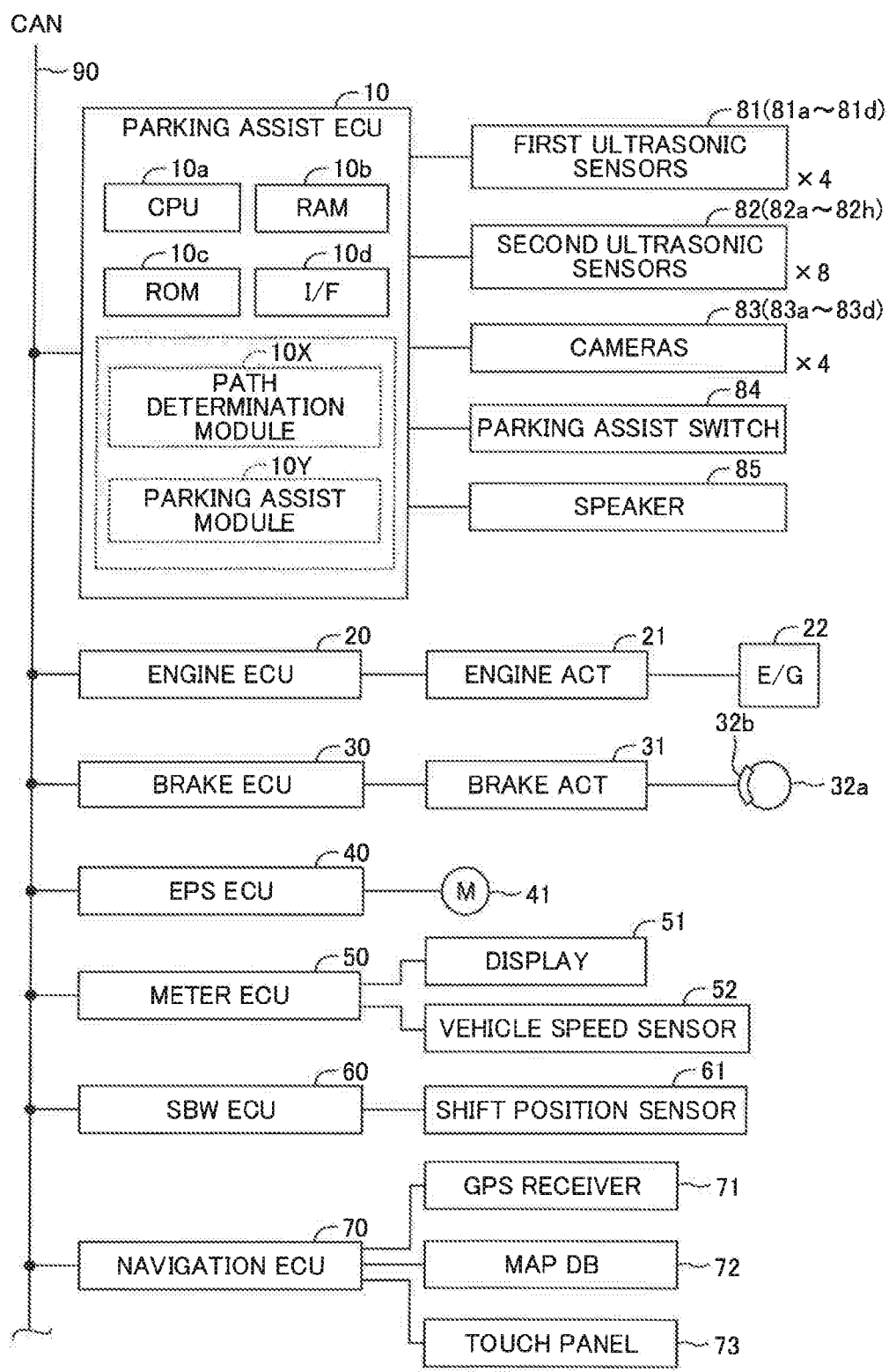
FIG. 1 is a schematic configuration diagram of a parking assist apparatus according to an embodiment.

A parking assist apparatus according to one embodiment (hereinafter sometimes referred to as "apparatus of this embodiment") is applied to a vehicle. In the following, a vehicle equipped with the parking assist apparatus may be referred to as "own vehicle" in order to distinguish the vehicle from other vehicles. As illustrated in FIG. 1, the parking assist apparatus includes a parking assist ECU 10. The parking assist ECU 10 includes a microcomputer including a central processing unit (CPU) 10a, a random-access memory (RAM) 10b, a read-only memory (ROM) 10c, an interface (I/F) 10d, and other components. The ECU herein stands for "electric control unit". The ECU includes a microcomputer including a CPU, a RAM, a ROM, an interface, and other components. The CPU is configured to execute instructions stored in the ROM to implement various functions.

The parking assist ECU 10 is connected to an engine ECU 20, a brake ECU 30, an electric power steering ECU (hereinafter referred to as "EPS ECU") 40, a meter ECU 50, a shift-by-wire (SBW) ECU 60, and a navigation ECU 70 via a controller area network (CAN) 90. These ECUs are connected to each other such that information can be transmitted and received to and from each other via the CAN 90. Therefore, a detection signal (detection value) of a sensor connected to a specific ECU is also transmitted to the other ECUs.

The engine ECU 20 is connected to an engine actuator 21. The engine actuator 21 includes a throttle valve actuator configured to change an opening degree of a throttle valve of an internal combustion engine 22. The engine ECU 20 is capable of changing a torque to be generated by the internal combustion engine 22 by driving the engine actuator 21. Thus, the engine ECU 20 is capable of controlling a driving force of the vehicle by controlling the engine actuator 21. When the vehicle is a hybrid vehicle, the engine ECU 20 is capable of controlling a driving force of the vehicle to be generated by any one of or both of "an internal combustion engine and a motor" serving as vehicle driving sources. Further, when the vehicle is an electric vehicle, the engine ECU 20 is capable of controlling a driving force of the vehicle to be generated by a motor serving as a vehicle driving source.

The brake ECU 30 is connected to a brake actuator 31. A braking force (braking torque) to be applied to wheels of the vehicle is controlled by the brake actuator 31. The brake actuator 31 adjusts a hydraulic pressure of liquid to be supplied to wheel cylinders integrated into brake calipers 32b in accordance with an instruction from the brake ECU 30 to use the hydraulic pressure to press brake pads against brake discs 32a, to thereby generate friction braking forces. Thus, the brake ECU 30 is capable of controlling a braking force of the vehicle by controlling the brake actuator 31.

The EPS ECU 40 is connected to an assist motor (M) 41. The assist motor 41 is integrated into a "steering mechanism including a steering wheel, a steering shaft coupled to the steering wheel, and a gear mechanism for steering" (not shown) of the vehicle. The EPS ECU 40 uses a steering torque sensor (not shown) provided in the steering shaft to detect a steering torque input to the steering wheel by the driver, to thereby drive the assist motor 41 based on the steering torque. The EPS ECU 40 applies a steering torque (steering assist torque) to the steering mechanism through the drive of the assist motor 41. Thus, the EPS ECU 40 is capable of assisting the steering operation of the driver or changing (controlling) a steering angle of the vehicle automatically.

The meter ECU 50 is connected to a display 51 and a vehicle speed sensor 52. The display 51 is a multi-information display provided in front of a driver's seat. The display 51 displays various types of information in addition to measurement values such as a vehicle speed and an engine revolution speed. A head-up display may be employed as the display 51. The vehicle speed sensor 52 detects the speed of the vehicle (vehicle speed) and outputs a signal indicating the vehicle speed to the meter ECU 50. The vehicle speed detected by the vehicle speed sensor 52 is also transmitted to the parking assist ECU 10.

The SBW ECU 60 is connected to a shift position sensor 61. The shift position sensor 61 detects a position of a shift lever serving as a movable portion of a shift operation portion. In this example, positions of the shift lever include a parking position (P), a forward position (D), and a reverse position (R). The SBW ECU 60 is configured to receive the position of the shift lever from the shift position sensor 61 to control a transmission and/or driving-direction switching mechanism (not shown) of the vehicle based on the shift lever position (i.e., performs shift control of the vehicle).

More specifically, when the position of the shift lever is "P", the SBW ECU 60 controls the transmission and/or driving-direction switching mechanism so that the driving force is not transmitted to drive wheels and the vehicle is thus mechanically locked to a stop position. When the position of the shift lever is "D", the SBW ECU 60 controls the transmission and/or driving-direction switching mechanism so that the driving force for moving the vehicle forward is transmitted to the drive wheels. Further, when the position of the shift lever is "R", the SBW ECU 60 controls the transmission and/or driving-direction switching mechanism so that the driving force for moving the vehicle backward is transmitted to the drive wheels. The SBW ECU 60 is configured to output to the steering assist ECU 10 a signal indicating the position of the shift lever received from the shift position sensor 61.

The navigation ECU 70 includes a GPS receiver 71 for receiving a GPS signal for detecting the "latitude and longitude" of the place where the vehicle is positioned, a map database 72 storing map information, and a touch panel (touch panel type display) 73. The navigation ECU 70 performs various arithmetic processing based on the latitude and longitude of the place where the vehicle is positioned, the map information, and the like, and displays on the touch panel 73 the position of the vehicle on the map. The display mode at the time when the "map and position of the vehicle on the map" are displayed on the touch panel 73 is hereinafter referred to as "navigation mode". The touch panel 73 is a touch panel type display capable of displaying maps, images, and the like.

The display mode of the touch panel 73 includes, in addition to the navigation mode, a parking assist mode. The parking assist mode is a display mode at the time when parking assist control for parking the vehicle or moving the parked vehicle from a parking space is performed. A home button (not shown) is arranged near the touch panel 73. In a case where the display mode is the parking assist mode, the display mode switches to the navigation mode when the home button is pressed. In a case where the display mode is the navigation mode, the display mode switches to the parking assist mode when the home button is pressed.

The parking assist ECU 10 is connected to a plurality of first ultrasonic sensors 81a to 81d, a plurality of second ultrasonic sensors 82a to 82h, a plurality of cameras 83a to 83d, a parking assist switch 84, and a speaker 85. The plurality of first ultrasonic sensors 81a to 81d are collectively referred to as "first ultrasonic sensors 81". The plurality of second ultrasonic sensors 82a to 82d are collectively referred to as "second ultrasonic sensors 82". The plurality of cameras 83a to 83d are collectively referred to as "cameras 83".

Each of the first ultrasonic sensors 81 and the second ultrasonic sensors 82 (hereinafter collectively referred to as "ultrasonic sensor" unless it is required to distinguish between the sensors) transmits ultrasonic waves in a pulsed manner in a predetermined range of surroundings of the vehicle, and receives reflected waves that have been reflected by an object. The ultrasonic sensor is capable of detecting a distance (reflection point distance) between the ultrasonic sensor and a "reflection point, which is a point on the object from which the transmitted ultrasonic waves have been reflected" based on the time from transmission of the ultrasonic waves to reception thereof.

Figure 2:
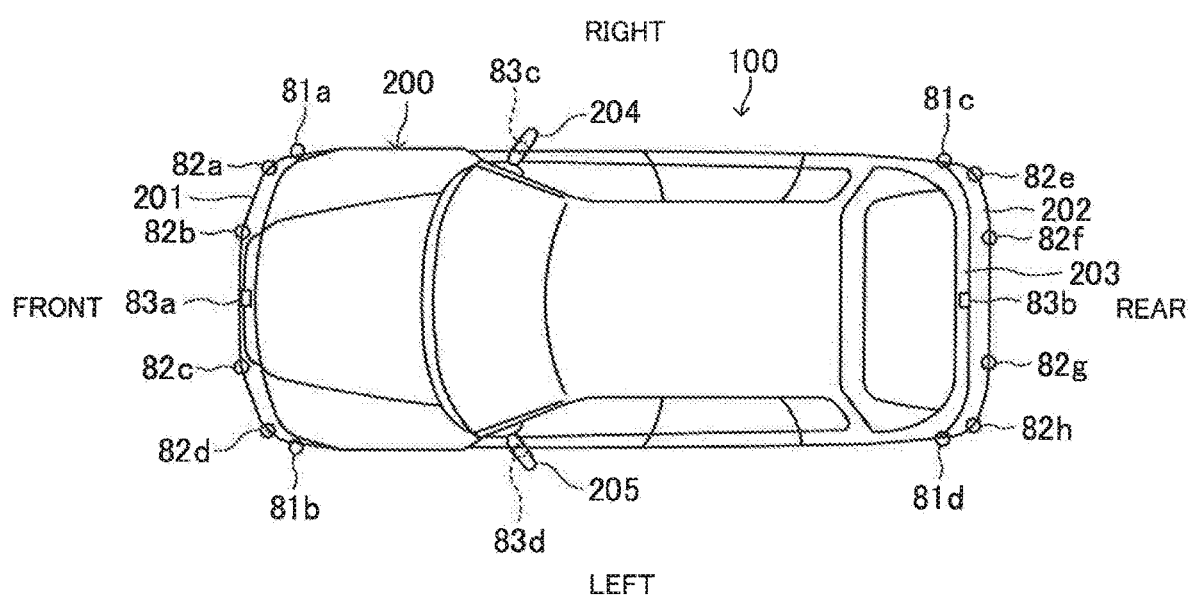
FIG. 2 is a plan view of a vehicle for illustrating an arrangement of first ultrasonic sensors, second ultrasonic sensors, and cameras.

The first ultrasonic sensors 81 are used for detecting objects positioned relatively far from the vehicle compared with the second ultrasonic sensors 82. As illustrated in FIG. 2, the first ultrasonic sensor 81a is arranged at a position on the right side at a front portion of a vehicle body 200 (e.g., a right end portion of a front bumper 201), and detects the reflection point distance of an object on the right side in a front portion of the vehicle. The first ultrasonic sensor 81b is arranged at a position on the left side at the front portion of the vehicle body 200 (e.g., a left side end portion of the front bumper 201), and detects the reflection point distance of an object on the left side in the front portion of the vehicle. The first ultrasonic sensor 81c is arranged at a position on the right side at a rear portion of the vehicle body 200 (e.g., a right side end portion of a rear bumper 202), and detects the reflection point distance of an object on the right side in a rear portion of the vehicle. The first ultrasonic sensor 81d is arranged at a position on the left side at the rear portion of the vehicle body 200 (e.g., a left side end portion of the rear bumper 202), and detects the reflection point distance of an object on the left side in the rear portion of the vehicle.

The second ultrasonic sensors 82 are used for detecting objects relatively close to the vehicle. As illustrated in FIG. 2, four second ultrasonic sensors 82a to 82d are arranged on the front bumper 201 at intervals in a vehicle width direction. The second ultrasonic sensors 82a to 82d detect the reflection point distance of objects in front of the vehicle. Four second ultrasonic sensors 82e to 82h are arranged on the rear bumper 202 at intervals in the vehicle width direction. The second ultrasonic sensors 82e to 82h detect the reflection point distance of objects behind the vehicle.

Each of the cameras 83 is, for example, a digital camera including an image pickup element of a charge coupled device (CCD) or a CMOS image sensor (CIS). The cameras 83 output image data at a predetermined frame rate (i.e., every time a predetermined time elapses). An optical axis of each camera is set obliquely downward from the vehicle body of the vehicle. Therefore, the cameras 83 are configured to photograph a state of surroundings of the vehicle (including the position, shape, and the like of separation lines, objects, regions in which the vehicle can be parked, regions to which the vehicle can be moved from a parking space, and the like) to be confirmed when the vehicle is parked or moved from the parking space, and output image data to the parking assist ECU 10.

As illustrated in FIG. 2, the camera 83a is arranged at a substantially central portion of the front bumper 201 in the vehicle width direction, and photographs the region in front of the vehicle. The camera 83b is arranged at a wall portion of a rear trunk 203 at the rear portion of the vehicle body 200, and photographs the region behind the vehicle. The camera 83c is arranged on a right-side door mirror 204, and photographs the region to the right side of the vehicle. The camera 83d is arranged on a left-side door mirror 205, and photographs the region to the left of the vehicle.

The parking assist ECU 10 receives a detection signal from each of the first ultrasonic sensors 81 and the second ultrasonic sensors 82 each time a predetermined period of time (hereinafter also referred to as "first predetermined time period" for the sake of convenience) elapses. The parking assist ECU 10 plots information (i.e., reflection points and reflection point distances) included in the detection signals on a two-dimensional map. This two-dimensional map is a plan view in which a vehicle position is set as an origin, a travel direction of the vehicle is set as an X axis, and a left direction of the vehicle is set as a Y axis. The position of the vehicle is the center position in plan view of a left front wheel and a right front wheel. The position of the vehicle may also be another specific position on the vehicle (e.g., a center position of a left rear wheel and a right rear wheel in plan view, position of the center of gravity of the vehicle in plan view, or a geometric center position of the vehicle in plan view).

Each time the first predetermined time period elapses, the parking assist ECU 10 acquires image data from each of the cameras 83. The parking assist ECU 10 detects an object in the surroundings of the vehicle by analyzing the image data from each camera 83, and identifies the position (distance and direction) and shape of the object with respect to the vehicle. The parking assist ECU 10 also detects, in the image data from each of the cameras 83, separation lines (including separation lines separating lanes and separation lines separating parking regions) drawn on the road surface in the surroundings of the vehicle, and identifies the position (distance and direction) and shape of the separation lines with respect to the vehicle. The parking assist ECU 10 draws on the above-mentioned two-dimensional map the objects and separation lines that have been specified (detected) based on the image data.

The parking assist ECU 10 detects objects present in the surroundings of the vehicle (within a predetermined distance range from the position of the vehicle) based on the information shown on the two-dimensional map, and also detects a "region in which an object is not present" in the surroundings of the vehicle. When the region in which an object is not present is a region having a size and a shape that allow the own vehicle to park (or exit from a parking space) with room to spare, the parking assist ECU 10 determines that region to be a "candidate region".

The "first ultrasonic sensors 81, second ultrasonic sensors 82, and cameras 83" are collectively referred to as "vehicle peripheral sensors (or information acquisition devices)". The "information (e.g., position and shape) on an object present in the surroundings of the vehicle and information (e.g., position and shape) on a separation line on the road surface in the surroundings of the vehicle" obtained based on the signals from the vehicle peripheral sensors are collectively referred to as "vehicle-surroundings information".

The parking assist switch 84 is a switch to be operated (pressed/depressed) when the driver instructs the parking assist ECU 10 to start parking assist control. Details of parking assist control will be described later. Parking assist control is also called "intelligent parking assist (IPA)". The parking assist control includes a plurality of assist modes as describe later.

The speaker 85 generates a sound when a command to utter a sound is received from the parking assist ECU 10.

(Details of Parking Assist Control)

The parking assist ECU 10 monitors the operation with respect to the parking assist switch 84, the position of the shift lever and the vehicle speed as described later, and determines whether or not an assist request is issued/generated. The assist request includes a perpendicular-parking assist request, a parallel-parking assist request, and an exit-from-parking-space assist request. When the parking assist ECU 10 determines that the assist request is issued, the parking assist ECU 10 changes the display mode of the touch panel 73 to the parking assist mode automatically.

"Perpendicular parking" is to park the own vehicle in a direction perpendicular to a travel direction of a road being traveled along. The perpendicular parking is synonymous with moving the own vehicle to park the own vehicle in parallel to other parked vehicles. More specifically, perpendicular parking refers to parking the own vehicle such that one side of the own vehicle is opposed to one side of another vehicle (first another vehicle) and the other side of the own vehicle is opposed to one side of another vehicle (second another vehicle), and a longitudinal direction axis passing through the center of the own vehicle in the vehicle width direction and a longitudinal direction axis passing through the center of each of the first and second another vehicles in the vehicle width direction are parallel to each other. The perpendicular parking includes parking the own vehicle such that the own vehicle faces in a right-angle direction to the travel direction of the road being traveled along and at least one of the left and right sides of the own vehicle is parallel to "a white line, a wall, a fence, a guardrail, or the like".

"Parallel parking" is to park the own vehicle in a direction parallel to the travel direction of the road being traveled along. The parallel parking is synonymous with parking the own vehicle to come into line with other vehicles parked along the travel direction of the road. More specifically, in parallel parking, the own vehicle is parked such that the front end portion of the own vehicle is opposed to the rear end portion (or front end portion) of the first another vehicle and the rear end portion of the own vehicle is opposed to the front end portion (or rear end portion) of the second another vehicle, and the longitudinal direction axis passing through the center of the own vehicle in the vehicle width direction and the longitudinal direction axis passing through the center of each of the first and second another vehicles in the vehicle width direction are positioned on substantially the same line. "Exit-from-parking-space" is to move the own vehicle parked in the above-mentioned manner out to a road from a parking space.

Each time the parking assist switch 84 is pressed, the parking assist ECU 10 sequentially switches a switch mode from, in order, a perpendicular-parking mode, a parallel-parking mode, an exit-from-parking-space mode and an unset mode. Therefore, for example, when the parking assist switch 84 is pressed once when the switch mode is the unset mode, the switch mode is changed to the perpendicular-parking mode. When the parking assist switch 84 is pressed twice when the switch mode is the unset mode, the switch mode is changed to the parallel-parking mode. When the parking assist switch 84 is pressed three times when the switch mode is the unset mode, the switch mode is changed to the exit-from-parking-space mode. When the parking assist switch 84 is pressed three times when the switch mode is the perpendicular-parking mode, the switch mode is changed to the unset mode. The parking assist switch 84 may be a rotary type switch, and in this case, the switch mode is switched to the perpendicular-parking mode, the parallel-parking mode, the exit-from-parking-space mode and the unset mode in accordance with a position to which the parking assist switch 84 is rotated.

<<Perpendicular-Parking Assist Request>>

The parking assist ECU 10 determines that the perpendicular-parking assist request has been issued when all the conditions described below are satisfied.

(Condition A1) Neither a perpendicular-parking assist request, a parallel-parking assist request nor an exit-from-parking-space assist request has been issued.
(Condition A2) The perpendicular-parking mode has been selected by a predetermined operation on the parking assist switch 84 (e.g., pressed once).
(Condition A3) The position of the shift lever at the time when the condition A2 is satisfied is the forward position (D).
(Condition A4) The vehicle speed at the time when the condition A2 is satisfied is equal to a predetermined stop determination vehicle speed (for example, the speed is 0 [km/h]). That is, the driver is operating a brake pedal.
(Condition A5) A candidate region (perpendicular-parking candidate region) has been detected. This perpendicular-parking candidate region is adjacent to the road being traveled along, has a shortest distance from the position of the vehicle equal to or less than a predetermined distance, and has a size and shape allowing the vehicle to be parked through the perpendicular-parking mode.

<<Parallel-Parking Assist Request>>

The parking assist ECU 10 determines that a parallel-parking assist request has been issued when all the conditions described below are satisfied.

(Condition B1) Neither a perpendicular-parking assist request, a parallel-parking assist request nor an exit-from-parking-space assist request has been issued.
(Condition B2) The parallel-parking mode has been selected by a predetermined operation on the parking assist switch 84 (e.g., pressed twice consecutively).
(Condition B3) The position of the shift lever at the time when the condition B2 is satisfied is the forward position (D).
(Condition B4) The vehicle speed at the time when the condition B2 is satisfied is equal to the predetermined stop determination vehicle speed (for example, the speed is 0 [km/h]). That is, the driver is operating the brake pedal.
(Condition B5) A candidate region (parallel-parking candidate region) has been detected. This parallel-parking candidate region is adjacent to the road being traveled along, has a shortest distance from the position of the vehicle equal to or less than a predetermined distance, and has a size and shape allowing the vehicle to be parked through the parallel-parking mode.

<<Exit-From-Parking-Space Assist Request>>

The parking assist ECU 10 determines that an exit-from-parking-space assist request has been issued when all the conditions described below are satisfied.

(Condition C1) Neither a perpendicular-parking assist request, a parallel-parking assist request nor an exit-from-parking-space assist request has been issued.
(Condition C2) The exit-from-parking-space mode has been selected by a predetermined operation on the parking assist switch 84 (e.g., pressed three times consecutively).
(Condition C3) The position of the shift lever at the time when the condition C2 is satisfied is the parking position (P).
(Condition C4) The vehicle speed at the time when the condition C2 is satisfied is equal to the predetermined stop determination vehicle speed (for example, the speed is 0 [km/h]).
(Condition C5) A candidate region (exit-from-parking-space candidate region) has been detected. This exit-from-parking-space candidate region is in the road adjacent to a space in which the vehicle is parked, and has a size and shape allowing the vehicle to move thereto through the exit-from-parking-space mode.

When the perpendicular-parking assist request has been issued, the parking assist ECU 10 executes parking assist control for causing the own vehicle to park itself in a predetermined region within the perpendicular-parking candidate region (i.e., executes the perpendicular-parking mode of parking assist control).

When the parallel-parking assist request has been issued, the parking assist ECU 10 executes parking assist control for causing the own vehicle to park itself in a predetermined region within the parallel-parking candidate region (i.e., executes the parallel-parking mode of parking assist control).

When the exit-from-parking-space assist request has been issued, the parking assist ECU 10 executes parking assist control for causing the own vehicle to move itself to a predetermined region within the exit-from-parking-space candidate region (i.e., executes the exit-from-parking-space mode of parking assist control).

The above-mentioned assist modes of parking assist control are similar to each other except that regions (target regions) to which the own vehicle is to be finally moved are different from each other. When the parking assist ECU 10 determines that the above-mentioned assist request (one of the perpendicular-parking assist request, the parallel-parking assist request and the exit-from-parking-space assist request) has been issued, the parking assist ECU 10 sets, as a target position, the position of the own vehicle at the time when the own vehicle is assumed to be parked in a predetermined region in the candidate region. In this example, the position of the own vehicle is specified/defined by the center position in plan view of the left front wheel and the right front wheel of the own vehicle. The parking assist ECU 10 determines/sets, as a target path, a path along which the position of the own vehicle is to be moved from the current own vehicle position (current position) to the target position. The parking assist ECU 10 executes parking assist control such that the vehicle moves/travels along the target path.

When the target path has been determined/set, the parking assist ECU 10 determines "the direction to move the own vehicle (specifically, the position of the shift lever), a steering angle pattern, and a speed pattern" for moving the own vehicle along the target path. The parking assist ECU 10 requests the driver to perform a switching operation of the shift lever by using a screen display and/or a sound in accordance with the determined position of the shift lever. When the driver has performed the switching operation of the shift lever, the parking assist ECU 10 executes steering angle automatic control, driving force automatic control and braking force automatic control as parking assist control.

Specifically, the steering angle pattern is data in which the position of the own vehicle on the target path and the steering angle are associated with each other. The parking assist ECU 10 transmits a steering command (including a target steering angle) to the EPS ECU 40 via the CAN 90 in accordance with the determined steering angle pattern. When the steering command has been received from the parking assist ECU 10, the EPS ECU 40 drives the assist motor 41 based on the target steering angle specified by the steering command to cause the actual steering angle to match the target steering angle (i.e., executes steering angle automatic control).

The speed pattern is data in which the position of the own vehicle on the target path and a travel speed of the own vehicle are associated with each other. The speed pattern represents changes in the travel speed exhibited when the vehicle travels along the target path. The parking assist ECU 10 transmits a driving force control command to the engine ECU 20 via the CAN 90 in accordance with the determined speed pattern. When the driving force control command has been received from the parking assist ECU 10, the engine ECU 20 controls the engine actuator 21 in accordance with the driving force control command (i.e., executes driving force automatic control for controlling the driving force of the vehicle). The parking assist ECU 10 also transmits a braking force control command to the brake ECU 30 via the CAN 90 in accordance with the determined speed pattern.

When the braking force control command has been received from the parking assist ECU 10, the brake ECU 30 controls the brake actuator 31 in accordance with the braking force control command (i.e., executes braking force automatic control for controlling the braking force of the vehicle).

As described above, the parking assist ECU 10 has functions as a "path determination module 10X" programmed to determine/set a target path" and as a "parking assist module 10Y programmed to execute the parking assist control including the steering angle automatic control for changing the steering angle of the vehicle, the driving force automatic control for controlling the driving force of the vehicle, and the braking force automatic control for controlling the braking force of the vehicle", which are implemented by the CPU 10a.

(Outline of Operation)

As described above, even when the driving force automatic control and the braking force automatic control are executed in addition to the steering angle automatic control in the parking assist control, the driver needs to perform some operations by himself/herself. One example of such operations is a switching operation of the shift lever. The apparatus of this embodiment performs a request (i.e., operation request) relating to the switching operation of the shift lever by using a screen display and/or a sound at a point in time at which the vehicle has reached a travel-direction switching position.

However, the driver may not perform an operation corresponding to the above-described operation request in response to the operation request. For example, the driver may desire to terminate (cancel) the parking assist control and move the vehicle to another position (i.e., a position other than the set target position). However, when the vehicle is positioned at the travel-direction switching position, the braking force automatic control is continued, and the vehicle is maintained in a stopped state. Therefore, a problem occurs when the driver moves the vehicle therefrom.

In view of the above problem, when the apparatus of this embodiment requests the driver of the vehicle to perform a predetermined operation (for example, a switching operation of the shift lever) which is an operation necessary to continue the parking assist control, the apparatus determines whether or not the predetermined operation has been performed by the driver within a predetermined period of time (i.e., monitors whether or not the predetermined operation has been performed). When it is determined that the predetermined operation has not been performed by the driver within the predeterminer period of time, the apparatus terminates (cancels) the parking assist control, and uses a screen display and/or a sound to notify/inform the driver that the parking assist control is terminated. In the above manner, the apparatus of this embodiment can continue or terminate (cancel) the parking assist control according to whether or not the driver has performed the predetermined operation (response) corresponding to the operation request. Hereinafter, the expression "terminating the parking assist control" means terminating/canceling the parking assist control before a completion processing of the parking assist control described later (i.e., before execution of Step 525 in the routine of FIG. 5). Therefore, the driver can terminate the parking assist control by maintaining the state in which the operation request is not performed only for the predetermined period of time without performing a specific operation. This allows the driver to start moving the vehicle to another position.

(Operations in Perpendicular-Parking Assist)

Next, operations to be performed when parking assist control is executed in response to a perpendicular-parking assist request are described. The CPU $10a$ of the parking assist ECU 10 (hereinafter simply referred to as "CPU") is configured to execute each of the routines illustrated in FIG. 3 to FIG. 5 each time a "second predetermined time period equal to or longer than the first predetermined time period" elapses. The CPU further acquires the vehicle-surroundings information from the vehicle peripheral sensors by executing a routine (not shown) each time the first predetermined time period elapses. The CPU also updates the above-mentioned two-dimensional map based on the vehicle-surroundings information by executing a routine (not shown) each time the first predetermined time period elapses.

In addition, when an ignition key switch (start switch) (not shown) of the vehicle is changed from an off position to an on position, the CPU executes an initialization routine (not shown) to set values of various flags, which are described later, to "0" (i.e., reset the values of various flags).

Figure 3:
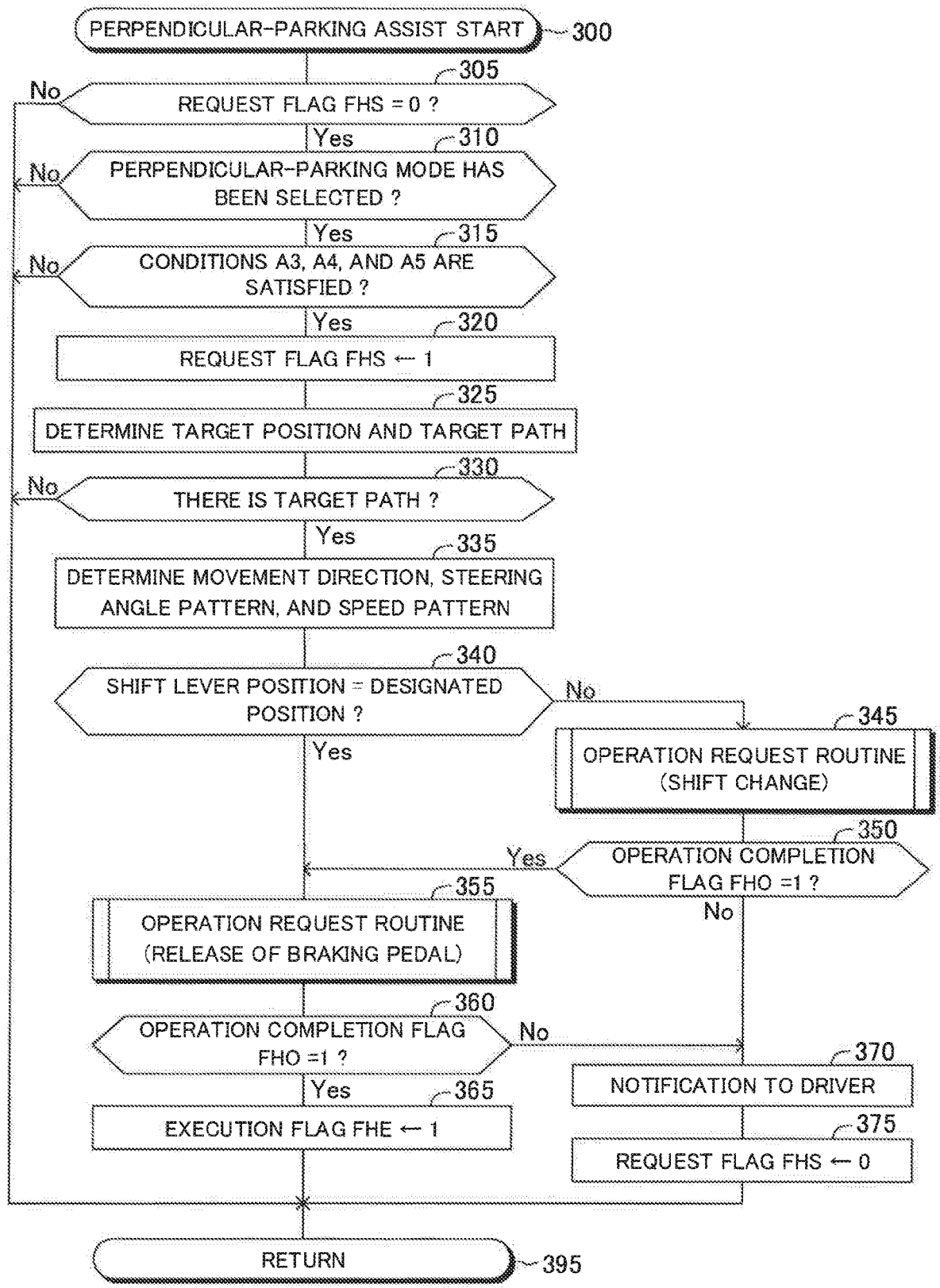
FIG. 3 is a flowchart for illustrating a "perpendicular-parking assist start routine" to be executed by a CPU of a parking assist ECU in the embodiment.

When a predetermined timing is reached, the CPU starts the processing from Step 300 of FIG. 3, and advances the processing to Step 305. In Step 305, the CPU determines whether or not a value of an assist request flag (hereinafter simply referred to as "request flag") FHS is "0". When the value of the request flag FHS is "0", this means that the assist request (any one of the perpendicular-parking assist request, the parallel-parking assist request, and the exit-from-parking-space assist request) has not been issued. When the value of the request flag FHS is "1", this means that the assist request has been issued. In other words, in Step 305, the CPU determines whether or not the condition A1 is satisfied. When the value of the request flag FHS is not "0", the CPU makes a "No" determination in Step 305, proceeds directly to Step 395, and temporarily ends the present routine.

Assuming that the value of the request flag FHS is "0", the CPU makes a "Yes" determination in Step 305, and proceeds to Step 310. In Step 310, the CPU determines whether or not the perpendicular-parking mode has been selected by a predetermined operation of the parking assist switch 84 (whether or not the condition A2 is satisfied). When it is determined that the perpendicular-parking mode is not selected, the CPU makes a "No" determination in Step 310, proceeds directly to Step 395, and temporarily ends the present routine.

Assuming that the perpendicular-parking mode has been selected, the CPU makes a "Yes" determination in Step 310, and proceeds to Step 315. In Step 315, the CPU determines whether or not all of the above-mentioned "condition A3, condition A4, and condition A5" are satisfied. The condition that all of the conditions A3, A4, and A5 are satisfied is also referred to as "perpendicular-parking assist execution condition". When the perpendicular-parking assist execution condition is not satisfied, the CPU makes a "No" determination in Step 315, proceeds directly to Step 395, and temporarily ends the present routine.

Assuming that the perpendicular-parking assist execution condition is satisfied, the CPU makes a "Yes" determination in Step 315, executes the processing of Step 320 and Step 325 (described below) in this order, and proceeds to Step 330.

Step 320: The CPU sets the value of the request flag FHS to "1".

Step 325: The CPU sets, as a provisional target region, a region occupied by the vehicle body of the vehicle when it is assumed that the own vehicle has been parked in each of the detected perpendicular-parking candidate regions. The CPU also sets, as a provisional target position, the position of the vehicle at the time when the own vehicle has been parked in that provisional target region.

Furthermore, in Step 325, the CPU also calculates a path along which the position of the vehicle is to be moved from the current own vehicle position (current position) to the provisional target position as a provisional target path. The target path is a path along which the vehicle body of the vehicle can be moved from its current position to the target position while maintaining a gap equal to or more than a predetermined distance from an object (e.g., another vehicle, a curb stone, and a guardrail). That is, the CPU determines, as the provisional target path, a path that allows the vehicle to move to the provisional target position "while maintaining the distance between the vehicle and the object at the predetermined distance (margin distance) or more". Therefore, the following cases (i) or (ii) may occur: (i) two or more provisional target paths can be calculated/determined; and (ii) any provisional target path cannot be calculated/determined (that is, there is no provisional target path). The target path may also be calculated by one of various known calculation methods (e.g., a method proposed in Japanese Patent Application Laid-open No. 2015-3565). If two or more provisional target paths are calculated, the CPU determines a target path having the shortest distance among those provisional target paths as the final target path.

Figure 7:
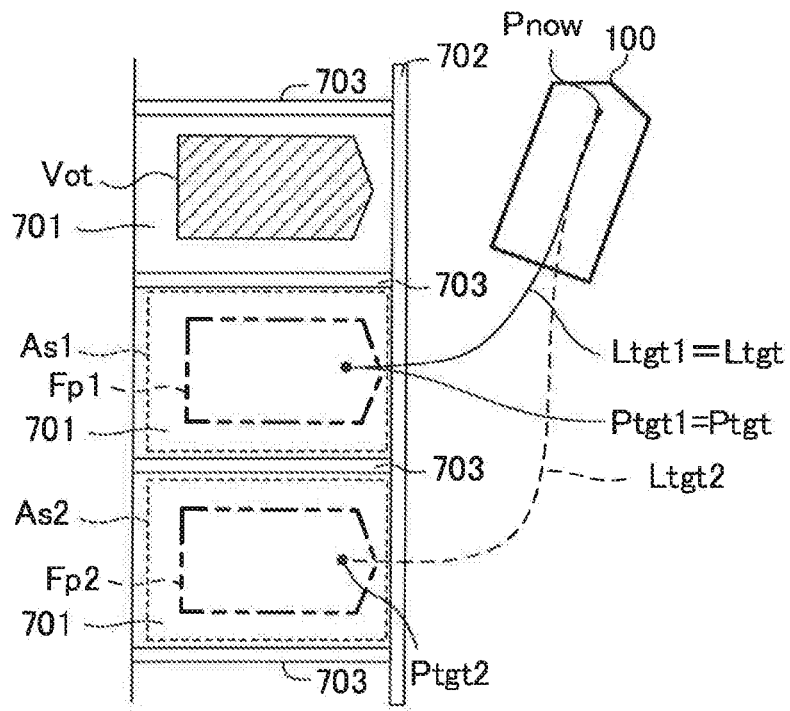
FIG. 7 is a plan view for illustrating a state in which the parking assist ECU in the embodiment has calculated target paths (Ltgt1, Ltgt2).

For example, in the example illustrated in FIG. 7, there are a plurality of parking regions 701 in the vicinity of a vehicle (own vehicle) 100, which is positioned at a current position Pnow. The plurality of parking regions 701 are separated by a first separation line 702 and a plurality of second separation lines 703. The CPU has detected another vehicle Vot as an object. Therefore, the CPU recognizes that there are a perpendicular-parking candidate region As1 and a perpendicular-parking candidate region As2 in the vicinity of the vehicle 100.

In this situation, when the CPU proceeds to Step 325 of the routine illustrated in FIG. 3, the CPU sets a provisional target region Fp1 for the perpendicular-parking candidate region As1, and determines, as a provisional target position Ptgt1, a position of the vehicle 100 at the time when it is assumed that the vehicle 100 has been parked in the provisional target region Fp1. Then, the CPU calculates, as a provisional target path Ltgt1, a path for moving the position of the vehicle 100 from the current position Pnow of the vehicle 100 to the provisional target position Ptgt1. Similarly, the CPU sets a provisional target region Fp2 for the perpendicular-parking candidate region As2, and determines, as a provisional target position Ptgt2, a position of the vehicle 100 at the time when it is assumed that the vehicle 100 has been parked in the provisional target region Fp2. Then, the CPU calculates, as a provisional target path Ltgt2, a path for moving the position of the vehicle 100 from the current position Pnow of the vehicle 100 to the provisional target position Ptgt2. After that, the CPU determines the target path Ltgt1, which has the shortest distance of the provisional target paths (Ltgt1 and Ltgt2), as a final target path Ltgt. Therefore, the perpendicular-parking candidate region As1 is determined as the final perpendicular parking region, the provisional target region Fp1 is determined as the final target region, and the provisional target position Ptgt1 is determined as the final target position Ptgt.

Figure 8:
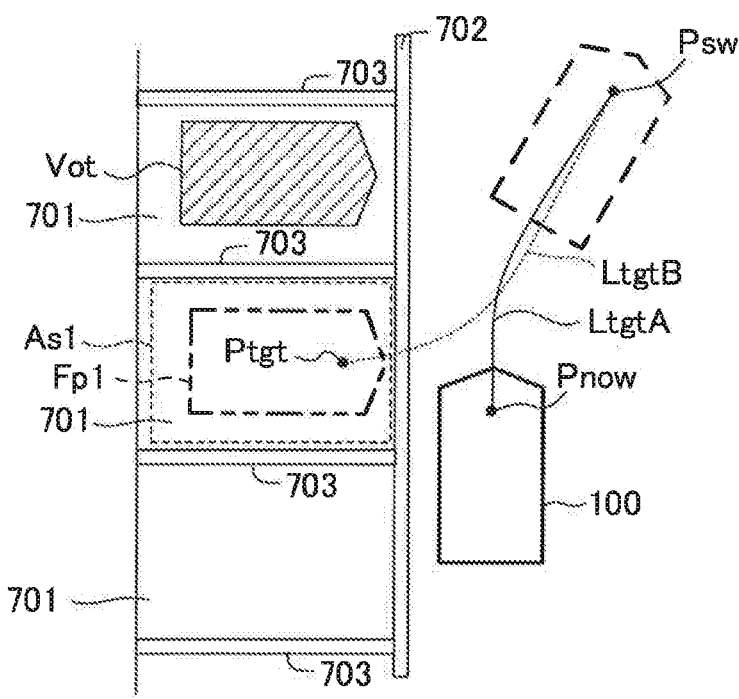
FIG. 8 is a plan view for illustrating a state in which the parking assist ECU in the embodiment has calculated a target path including a "travel-direction switching position (i.e., position at which the vehicle is to be temporarily stopped to switch a position of a shift lever)".

The CPU may calculate, when the vehicle 100 cannot be moved to the provisional target position merely by moving the own vehicle in reverse only once, as the provisional target path, a path in which the vehicle 100 is moved forward and then in reverse, or is moved in reverse, then forward, and then again moved in reverse (i.e., path involving switching of the travel direction of the vehicle 100). For example, as illustrated in FIG. 8, the CPU calculates a first path LtgtA for moving the vehicle 100 forward to a travel-direction switching position Psw (i.e., position at which the vehicle 100 is to temporarily stop in order to switch the position of the shift lever from the forward position (D) to the reverse position (R)) from the current position Pnow, and a second path LtgtB for moving the vehicle 100 in reverse from the travel-direction switching position Psw to the target position Ptgt, and sets the first path LtgtA and the second path LtgtB as the provisional target path. Hereinafter, the "travel-direction switching position" is simply referred to as "switching position".

Next, the CPU proceeds to Step 330 of the routine illustrated in FIG. 3, and determines whether or not there is a final target path (whether or not a final target path has successfully been calculated/determined). When there is no final target path, the CPU makes a "No" determination in Step 330, proceeds directly to Step 395, and temporarily ends the present routine. In this case, the CPU may display a message "Please move vehicle to another place" on the screen of the touch panel 73, and then return to Step 325. The CPU may also cause the speaker 85 to utter the message displayed on the screen.

On the other hand, when there is a final target path, the CPU makes a "Yes" determination in Step 330, and proceeds to Step 335. In Step 335, the CPU determines "the direction to move the vehicle (specifically, the position of the shift lever), the steering angle pattern, and the speed pattern" for moving the vehicle along the final target path Ltgt.

Next, in Step 340, the CPU determines whether or not the current shift lever position matches the "position designated in Step 335". When the current shift lever position matches the designated position, the CPU makes a "Yes" determination in Step 340, and proceeds to Step 355.

On the other hand, when the shift lever position does not match the position designated in Step 335, the CPU makes a "No" determination in Step 340, and proceeds to Step 345. In Step 345, the CPU executes an "operation request routine of FIG. 6" as described later to request the driver to perform a change of the position of the shift lever.

Next, in Step 350, the CPU determines whether or not a value of an operation completion flag FHO is "1". When the value of the operation completion flag FHO is "0", this means that the driver has not performed a predetermined operation (here, the change of the position of the shift lever) during execution of the operation request routine. When the value of the operation completion flag FHO is "1", this means that the driver has performed the predetermined operation during execution of the operation request routine.

When the value of the operation completion flag FHO is not "1", the CPU makes a "No" determination in Step 350, and executes the processing of Step 370 and Step 375 (described below) in this order. Then, the CPU proceeds to Step 395, and temporarily ends the present routine. In this case, the value of an assist execution flag (hereinafter, simply referred to as "execution flag") FHE is maintained at "0", and therefore, the parking assist control is not started (see Step 365, and "No" determination in Step 405 of FIG. 4).

Step 370: The CPU displays on the screen of the touch panel 73 a message notifying that the parking assist control is not started (that is, the parking assist control is cancelled), and causes the speaker 85 to utter the message displayed on the screen.

Step 375: The CPU sets the value of the request flag FHS to "0".

On the other hand, when the value of the operation completion flag FHO is "1", the CPU makes a "Yes" determination in Step 350, and proceeds to Step 355.

As the CPU proceeds to Step 355, the CPU executes the "operation request routine of FIG. 6" as described later to request the driver to "release his/her foot from the brake pedal".

Next, the CPU determines whether or not the value of the operation completion flag FHO is "1". When the value of the operation completion flag FHO is not "1" (that is, the driver has not released his/her foot from the brake pedal), the CPU executes the processing of Step 370 and Step 375 described above, proceeds to Step 395, and temporarily ends the present routine. Therefore, also in this case, since the value of the execution flag FHE is maintained at "0", the parking assist control is not started.

On the other hand, when the value of the operation completion flag FHO is "1" (that is, the driver has released his/her foot from the brake pedal), the CPU makes a "Yes" determination in Step 360, and proceeds to Step 365 to set the value of the execution flag FHE to "1". Then, the CPU proceeds to Step 395, and temporarily ends the present routine. Therefore, the parking assist control is started (see "Yes" determination in Step 405 of FIG. 4 described later).

Figure 4:
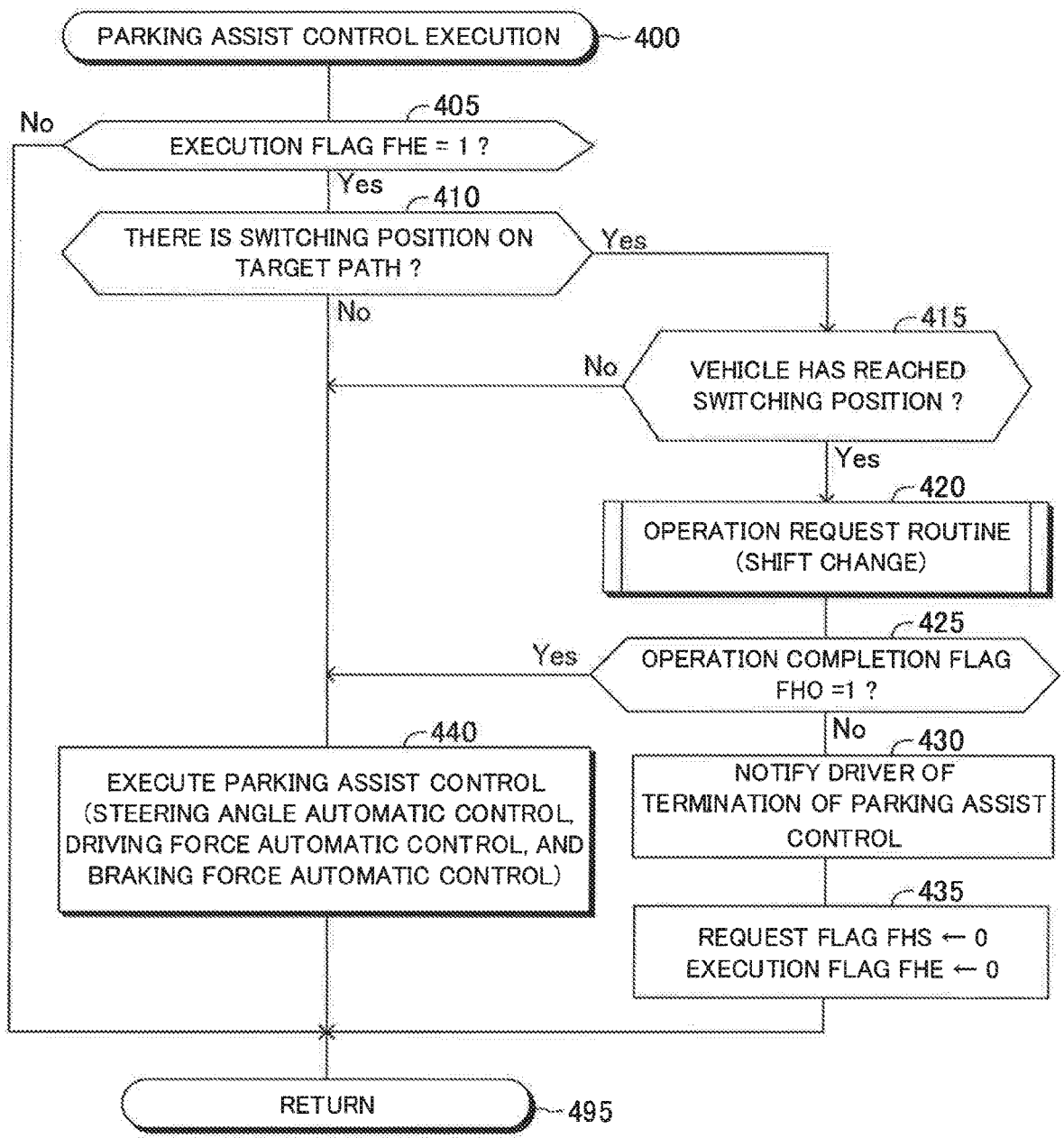
FIG. 4 is a flowchart for illustrating a "parking assist control execution routine" to be executed by the CPU of the parking assist ECU in the embodiment.

When a predetermined timing is reached, the CPU starts the processing from Step 400 of FIG. 4, and proceeds to Step 405. In Step 405, the CPU determines whether or not the value of the execution flag FHE is "1". When the value of the execution flag FHE is not "1", the CPU makes a "No" determination in Step 405, proceeds directly to Step 495, and temporarily ends the present routine.

On the other hand, when the value of the execution flag FHE is "1", the CPU makes a "Yes" determination in Step 405, and proceeds to Step 410 to determine whether or not there is a switching position on the target path. When there is no switching position on the target path (see the example illustrated in FIG. 7), the CPU makes a "No" determination in Step 410, and proceeds to Step 440. In Step 440, the CPU executes the parking assist control. More specifically, the CPU executes the steering angle automatic control by transmitting a steering command (target steering angle) to the EPS ECU 40 in accordance with the steering angle pattern. The CPU also executes the driving force automatic control by transmitting a driving force control command to the engine ECU 20 in accordance with the speed pattern. The CPU also executes the braking force automatic control by transmitting a braking force control command to the brake ECU 30 in accordance with the speed pattern. As a result, the driver can move the vehicle to the target region (move the position of the vehicle to the target position) without operating the steering wheel, an accelerator pedal, or the brake pedal by himself or herself. When the driver requests a large braking force by operating the brake pedal at a point in time at which Step 440 is being executed, the brake actuator 31 is controlled such that a braking force corresponding to that request is generated. In that case, the driving force of the vehicle is set to "0" by controlling the engine actuator 21. Then, the CPU proceeds to Step 495, and temporarily ends the present routine.

On the other hand, when there is a switching position on the target path (see the example illustrated in FIG. 8) at the point in time at which the CPU proceeds to Step 410, the CPU makes a "Yes" determination in Step 410, and proceeds to Step 415. In Step 415, the CPU determines whether or not the vehicle has reached the switching position. When the vehicle has not yet reached the switching position, the CPU makes a "No" determination in Step 415, and proceeds to Step 440 to execute the parking assist control as described above. Then, the CPU proceeds to Step 495, and temporarily ends the present routine.

Meanwhile, when the vehicle has reached the switching position, the CPU makes a "Yes" determination in Step 415, and proceeds to Step 420. On and after this point in time (the vehicle has reached the switching position), the CPU executes the braking force automatic control to apply the braking force to the vehicle to thereby stop the vehicle at the switching position.

In Step 420, the CPU executes the "operation request routine of FIG. 6" as described later to request the driver to perform a "change of the position of the shift lever". In the example illustrated in FIG. 8, assuming that the vehicle 100 has reached the travel-direction switching position Psw, the change of the position of the shift lever at this point in time means changing from the forward position (D) to the reverse position (R). The CPU executes the processing of Step 610 in FIG. 6 as described later to display on the screen of the touch panel 73 a message requesting to change the position of the shift lever from (D) to (R), and causes the speaker 85 to utter the message displayed on the screen.

Next, in Step 425, the CPU determines whether or not the value of the operation completion flag FHO is "1". When the value of the operation completion flag FHO is "1", the CPU makes a "Yes" determination in Step 425, and proceeds to Step 440 to execute the parking assist control as described above. Therefore, the CPU decreases the braking force applied to the vehicle to zero, and then, applies the driving force to the vehicle such that the vehicle travels along the target path. Then, the CPU proceeds to Step 495, and temporarily ends the present routine.

On the other hand, when the value of the operation completion flag FHO is not "1", this means that, although the operation request to switch/change the position of the shift lever from (D) to (R) is made, the driver has not performed the operation corresponding to that operation request within the predetermined period of time. In this case, the CPU makes a "No" determination in Step 425, and executes the processing of Step 430 and Step 435 (described below) in this order. Then, the CPU proceeds to Step 495, and temporarily ends the present routine.

Step 430: The CPU displays on the screen of the touch panel 73 a message notifying that the parking assist control is terminated/canceled, and causes the speaker 85 to utter the message displayed on the screen.

Step 435: The CPU sets the value of the request flag FHS and the value of the execution flag FHE to "0".

In this case, when the CPU again starts the routine of FIG. 4 from Step 400 and proceeds to Step 405, the CPU makes a "No" determination in Step 405. Therefore, the parking assist control is not executed/performed. That is, the application of the braking force by the braking force automatic control for stopping the vehicle at the switching position is terminated.

Figure 5:
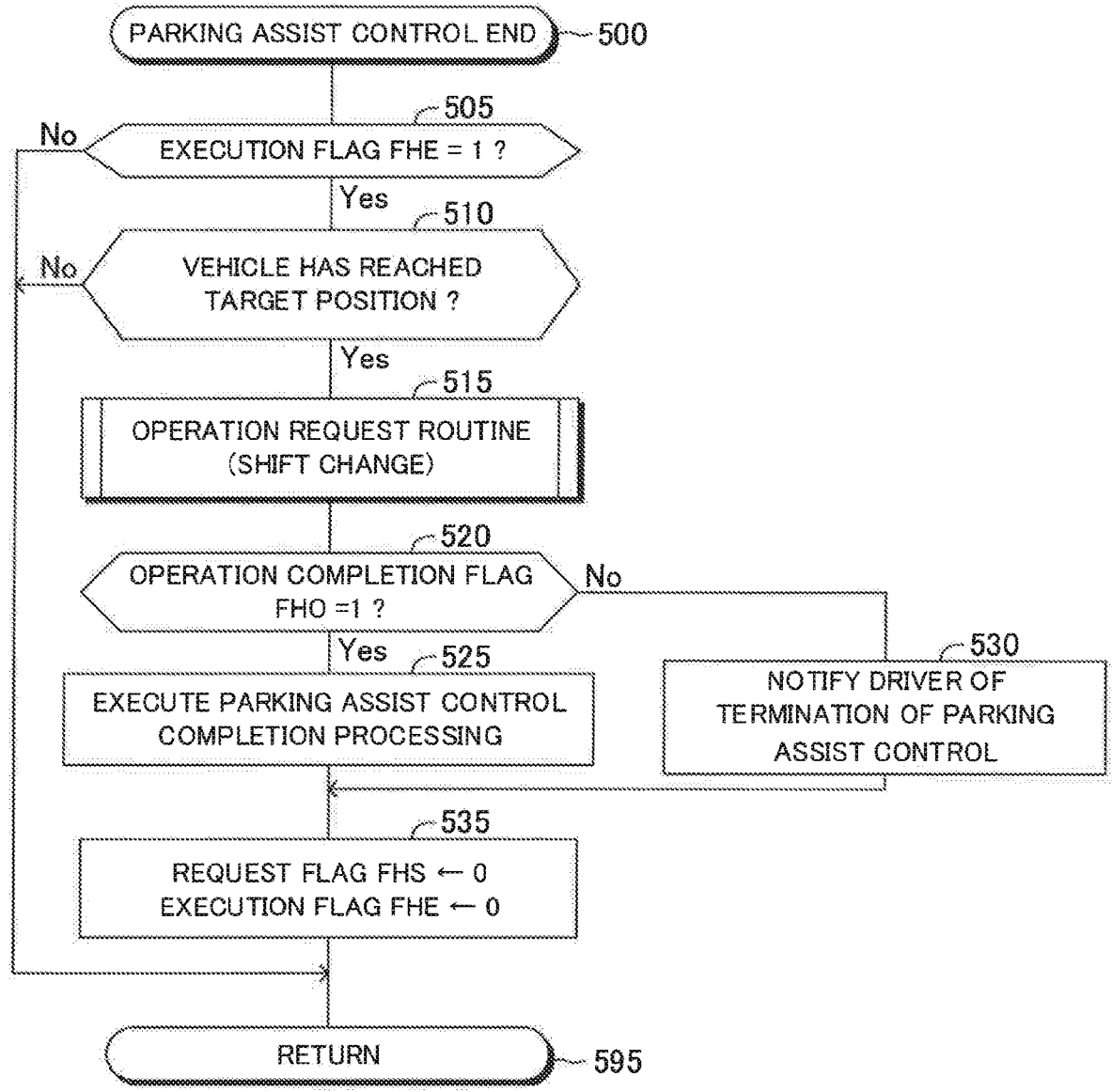
FIG. 5 is a flowchart for illustrating a "parking assist control end routine" to be executed by the CPU of the parking assist ECU in the embodiment.

When a predetermined timing is reached, the CPU starts the processing from Step 500 of FIG. 5, and proceeds to Step 505. In Step 505, the CPU determines whether or not the value of the execution flag FHE is "1". When the value of the execution flag FHE is not "1", the CPU makes a "No" determination in Step 505, proceeds directly to Step 595, and temporarily ends the present routine.

When the value of the execution flag FHE is "1", the CPU makes a "Yes" determination in Step 505, and proceeds to Step 510 to determine whether or not the vehicle has reached the final target position (the vehicle has reached the final target region). When the vehicle has not yet reached the target position, the CPU makes a "No" determination in Step 510, proceeds directly to Step 595, and temporarily ends the present routine.

On the other hand, when the vehicle has reached the target position, the CPU makes a "Yes" determination in Step 510, and proceeds to Step 515. On and after this point in time (at which the vehicle has reached the target position), the CPU executes the braking force automatic control to apply the braking force to the vehicle to thereby stop the vehicle at the target position. In Step 515, the CPU executes the "operation request routine of FIG. 6" as described later to request the driver to perform a "change of the position of the shift lever". Here, the change of the position of the shift lever means changing from the reverse position (R) to the parking position (P).

Next, in Step 520, the CPU determines whether or not the value of the operation completion flag FHO is "1". That is, the CPU determines whether or not the position of shift lever has been changed from the reverse position (R) to the parking position (P). When the value of the operation completion flag FHO is "1", the CPU makes a "Yes" determination in Step 520, and executes the processing of Step 525 and Step 535 (described below) in this order. Then, the CPU proceeds to Step 595, and temporarily ends the present routine.

Step 525: The CPU executes a "parking assist control completion processing" which is the final processing of the parking assist control. Specifically, the CPU displays on the screen of the touch panel 73 a message notifying that the parking assist control is successfully completed, and causes the speaker 85 to utter the message displayed on the screen. Further, the CPU terminates the application of the braking force by the braking force automatic control for stopping the vehicle at the target position.

Step 535: The CPU sets the value of the request flag FHS and the value of the execution flag FHE to "0".

On the other hand, when the value of the operation completion flag FHO is not "1", the CPU makes a "No" determination in Step 520, and executes the processing of Step 530 and Step 535 (described below) in this order. Then, the CPU proceeds to Step 595, and temporarily ends the present routine.

Step 530: The CPU displays on the screen of the touch panel 73 a message notifying that the parking assist control is terminated before its completion, and causes the speaker 85 to utter the message displayed on the screen.

Step 535: The CPU sets the value of the request flag FHS and the value of the execution flag FHE to "0".

In another example, when the driver has not performed the change of the position of the shift lever at the point in time at which the vehicle has reached the target position, the CPU may apply the braking force to the vehicle wheels only for a predetermined time on and after the processing of Step 530 is executed to thereby maintain the vehicle in a stopped state.

Next, with reference to FIG. 6, the "operation request routine" will be described which is performed by the CPU in each of Step 345, Step 355, Step 420 and Step 515. When the CPU proceeds to each of Step 345, Step 355, Step 420 and Step 515, the CPU starts the processing from Step 600 of FIG. 6, and executes the processing of Step 605 and Step 610 (described below) in this order. Then, the CPU proceeds to Step 615.

Step 605: The CPU sets the value of the operation completion flag FHO to "0".

Step 610: The CPU makes an operation request. Specifically, the CPU displays on the screen of the touch panel 73 a message requesting a "predetermined operation to be performed by the driver (for example, a change of the position of the shift lever)", and causes the speaker 85 to utter the message displayed on the screen. In this manner, the CPU notifies the driver of the operation request. In this example, the CPU displays the message about the predetermined operation on the touch panel 73 to notify the driver of the predetermined operation once.

Next, in Step 615, the CPU determines whether or not the above-mentioned predetermined operation (that is, operation corresponding to the operation request) has been performed by the driver. When the predetermined operation has been performed, the CPU makes a "Yes" determination in Step 615, and proceeds to Step 640 to set the value of the operation completion flag FHO to "1". Then, the CPU proceeds to Step 695, and temporarily ends the present routine.

On the other hand, when the predetermined operation (that is, operation corresponding to the operation request) has not been performed, the CPU makes a "No" determination in Step 615, and proceeds to Step 620 to determine whether or not a predetermined alert condition is satisfied. The alert condition is satisfied when an elapsed time from the point in time at which the operation request is started (Step 610) becomes equal to or longer than a first predetermined time threshold Tm1. Hereinafter, the "point in time at which the operation request is started" is also referred to as "operation request time point". When the alert condition is not satisfied, the CPU makes a "No" determination in Step 620, and returns to Step 615.

Meanwhile, when the alert condition is satisfied, the CPU makes a "Yes" determination in Step 620, and proceeds to Step 625. In Step 625, the CPU displays an alert message and causes the speaker 85 to utter the alert message displayed on the screen. The alert message includes a message notifying that the predetermined operation (that is, operation corresponding to the operation request) has not yet been performed, and a message prompting the driver to perform the predetermined operation immediately.

Next, in Step 630, the CPU determines whether or not the predetermined operation (that is, operation corresponding to the operation request) has been performed. When the predetermined operation has been performed, the CPU makes a "Yes" determination in Step 630, and proceeds to Step 640 to set the value of the operation completion flag FHO to "1". Then, the CPU proceeds to Step 695, and temporarily ends the present routine.

On the other hand, when the predetermined operation (that is, operation corresponding to the operation request) has not been performed, the CPU makes a "No" determination in Step 630, and proceeds to Step 635 to determine whether or not a predetermined termination condition (cancel condition) is satisfied. The termination condition is satisfied when the elapsed time from the operation request time point becomes equal to or longer than a second predetermined time threshold Tm2 which is longer than the first predetermined time threshold Tm1 (Tm2>Tm1). When the termination condition is not satisfied, the CPU makes a "No" determination in Step 635, and returns to Step 625.

On the other hand, when the termination condition is satisfied, the CPU makes a "Yes" determination in Step 635, and proceeds to Step 695 to temporarily end the present routine. In this case, the operation completion flag FHO is "0". Therefore, in the subsequent step (Step 350, Step 360, Step 425 or Step 520), the CPU makes a "No" determination. As a result, the parking assist control is terminated (cancelled).

As described above, the apparatus of this embodiment terminates the parking assist control in accordance with a response of the driver with respect to the operation request (whether or not the operation corresponding to the operation request has been performed). Specifically, when the apparatus requests the driver to perform a predetermined operation which is an operation to be performed with respect to the parking assist control, the apparatus monitors whether or not the predetermined operation has been performed by the driver. In this embodiment, the "predetermined operation" includes (i) the release of the braking pedal and the change of the position of the shift lever in the routine of FIG. 3, (ii) the change of the position of the shift lever in the routine of FIG. 4, and (iii) the change of the position of the shift lever in the routine of FIG. 5. The release of the braking pedal and the change of the position of the shift lever in the routine of FIG. 3 are operations necessary to start the parking assist control. The change of the position of the shift lever in the routine of FIG. 4 is an operation necessary to continue the parking assist control. Further, the change of the position of the shift lever in the routine of FIG. 5 is an operation necessary to successfully complete the parking assist control (execute the completion processing in Step 525). When the predetermined operation has not been performed by the driver, the apparatus terminates the parking assist control and notifies the driver that the parking assist control is terminated.

For example, at the point in time at which the vehicle 100 has reached the switching position Psw, the driver desires to move the vehicle to a position other than the target position, and therefore, the driver has not performed the predetermined operation. In this case, at the point in time at which the elapsed time from the operation request time point becomes equal to or longer than the second predetermined time threshold Tm2, the parking assist control is terminated (cancelled). Therefore, the application of the braking force by the braking force automatic control for stopping the vehicle at the switching position is terminated. Furthermore, the driver can recognize by the display on the touch panel 73 and sound from the speaker 85 that the parking assistance control is terminated. Accordingly, the driver can start to move the vehicle to another location without performing a specific operation to terminate the parking assist control (for example, an operation of the parking assist switch 84 to set the switch mode to the unset mode).

Further, when the elapsed time from the operation request time point becomes equal to or longer than the first time threshold Tm1, the apparatus of this embodiment alerts the driver without terminating the parking assist control. The driver performs the predetermined operation at the point in time at which the driver receives the alert (warning) to thereby continue the parking assist control. For example, although the driver desires to continue the parking assist control, even if the driver cannot perform the predetermined operation quickly, the parking assist control is not immediately terminated. The driver need not to push the parking assist switch 84 again to issue/generate the assist request. Therefore, it is possible to reduce the possibility that the driver feels inconvenient. On the other hand, even though the driver receives the alert, if the elapsed time from the operation request time point becomes equal to or longer than the second time threshold Tm2 without performing the predetermined operation, it is highly likely that the driver desires to terminate the parking assist control. Therefore, in such a case, the apparatus terminates the parking assist control. As described above, the apparatus of this embodiment can terminate (cancel) the parking assist control in accordance with the elapsed time from the operation request time point.

(Operations in Parallel-Parking Assist)

The parking assist control for parallel parking is similar to the parking assist control for the above-mentioned parking assist control for perpendicular parking except that regions (target regions) to which the own vehicle is to be finally moved are different from each other. The following description mainly focuses on differences.

Figure 9:
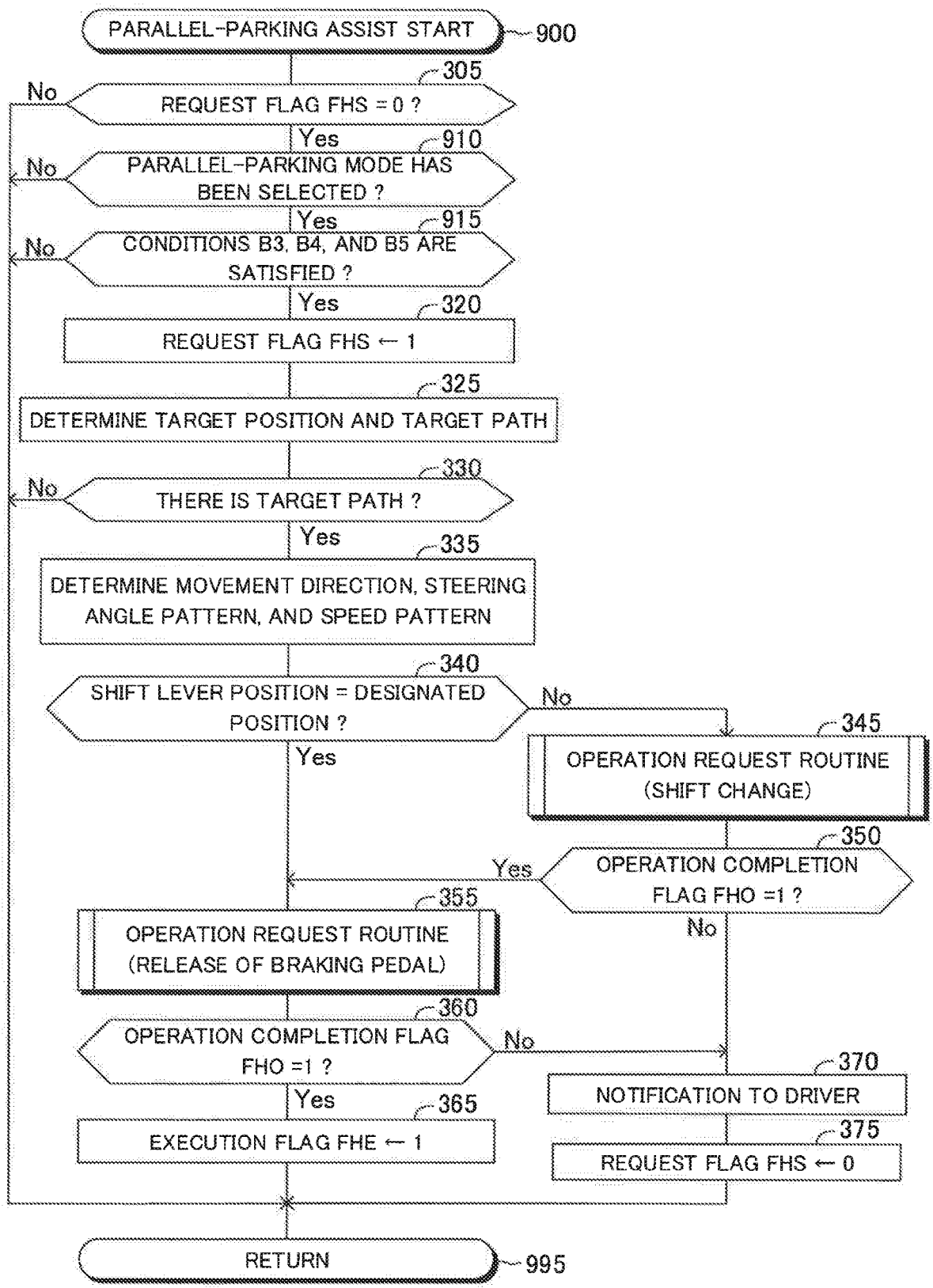
FIG. 9 is a flowchart for illustrating a "parallel-parking assist start routine" to be executed by the CPU of the parking assist ECU in the embodiment.

The CPU is configured to, each time the second predetermined time period elapses, execute a "parallel-parking assist start routine" illustrated in FIG. 9 in place of the routine illustrated in FIG. 3. The routine of FIG. 9 is a routine in which Step 310 and Step 315 in the routine of FIG. 3 are replaced with Step 910 and Step 915, respectively. In FIG. 9, for each step for executing the same processing as the step shown in FIG. 3, the same reference numeral in FIG. 3 is appended. Therefore, detailed descriptions of Steps in FIG. 9 denoted by the same reference numerals as in FIG. 3 will be omitted.

When a predetermined timing is reached, the CPU starts the processing from Step 900 of FIG. 9. As the CPU proceeds to Step 910, the CPU determines whether or not the parallel-parking mode has been selected by a predetermined operation of the parking assist switch 84 (whether or not the condition B2 is satisfied). When it is determined that the parallel-parking mode is not selected, the CPU makes a "No" determination in Step 910, proceeds directly to Step 995, and temporarily ends the present routine.

Assuming that the parallel-parking mode has been selected, the CPU makes a "Yes" determination in Step 910, and proceeds to Step 915. In Step 915, the CPU determines whether or not all of the above-mentioned "condition B3, condition B4, and condition B5" are satisfied. The condition that all of the conditions B3, B4, and B5 are satisfied is also referred to as "parallel-parking assist execution condition". When the parallel-parking assist execution condition is not satisfied, the CPU makes a "No" determination in Step 915, proceeds directly to Step 995, and temporarily ends the present routine.

Assuming that the parallel-parking assist execution condition is satisfied, the CPU makes a "Yes" determination in Step 915, and executes the subsequent processing of Steps 320 to 375 as described above.

As described above, in the parallel-parking assist, the apparatus of this embodiment can terminate the parking assist control in accordance with a response of the driver with respect to the operation request (whether or not the operation which is requested by the operation request has been performed). In addition, the routines of FIGS. 4 and 5 can be applied to the parking assist control performed in response to the parallel-parking assist request.

(Operations in Exit-From-Parking-Space Assist)

The parking assist control for exit-from-parking-space is similar to the parking assist control for the above-mentioned parking assist control for perpendicular parking except that regions (target regions) to which the own vehicle is to be finally moved are different from each other. The following description mainly focuses on differences.

Figure 10:
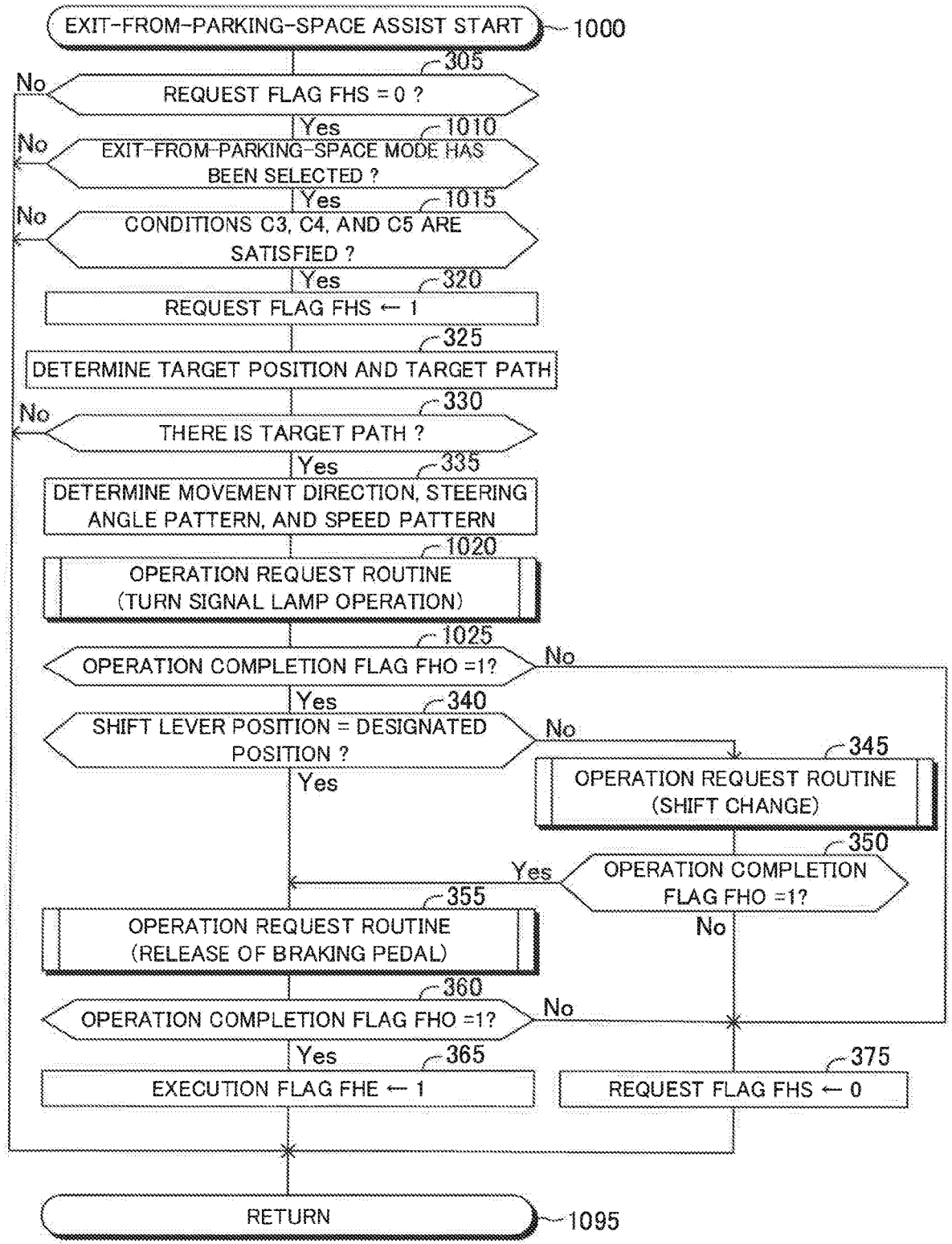
FIG. 10 is a flowchart for illustrating an "exit-from-parking-space assist start routine" to be executed by the CPU of the parking assist ECU in the embodiment.

The CPU is configured to, each time the second predetermined time period elapses, execute an "exit-from-parking-space assist start routine" illustrated in FIG. 10 in place of the routine illustrated in FIG. 3. The routine of FIG. 10 is a routine in which Step 310 and Step 315 in the routine of FIG. 3 are replaced with Step 1010 and Step 1015, respectively, and Step 1020 and Step 1025 are added after Step 335. In FIG. 10, for each step for executing the same processing as the step shown in FIG. 3, the same reference numeral in FIG. 3 is appended. Therefore, detailed descriptions of Steps in FIG. 10 denoted by the same reference numerals as in FIG. 3 will be omitted.

When a predetermined timing is reached, the CPU starts the processing from Step 1000 of FIG. 10. As the CPU proceeds to Step 1010, the CPU determines whether or not the exit-from-parking-space mode has been selected by a predetermined operation of the parking assist switch 84 (whether or not the condition C2 is satisfied). When it is determined that the exit-from-parking-space mode is not selected, the CPU makes a "No" determination in Step 1010, proceeds directly to Step 1095, and temporarily ends the present routine.

Assuming that the exit-from-parking-space mode has been selected, the CPU makes a "Yes" determination in Step 1010, and proceeds to Step 1015. In Step 1015, the CPU determines whether or not all of the above-mentioned "condition C3, condition C4, and condition C5" are satisfied. The condition that all of the conditions C3, C4, and C5 are satisfied is also referred to as "exit-from-parking-space assist execution condition". When the exit-from-parking-space assist execution condition is not satisfied, the CPU makes a "No" determination in Step 1015, proceeds directly to Step 1095, and temporarily ends the present routine.

Assuming that the exit-from-parking-space assist execution condition is satisfied, the CPU makes a "Yes" determination in Step 1015, and executes the processing of Steps 320 to 335 as described above. Next, the CPU proceeds to Step 1020.

Figure 6:
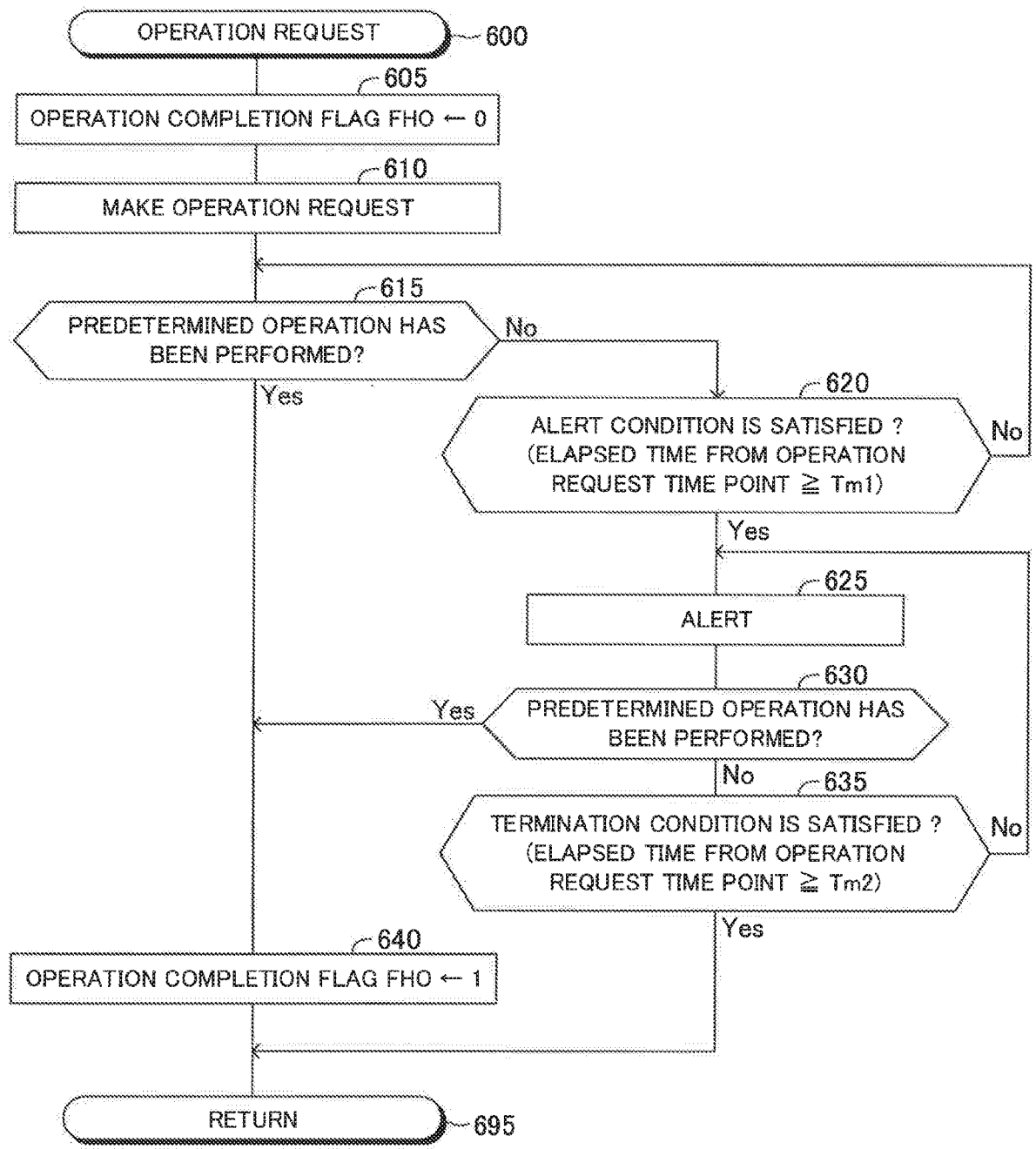
FIG. 6 is a flowchart for illustrating an "operation request routine" to be executed by the CPU of the parking assist ECU in the embodiment.

As the CPU proceeds to Step 1020, the CPU executes the "operation request routine of FIG. 6" to request the driver to perform an "operation of a turn signal lamp". Here, the operation of the turn signal lamp means turning on a turn signal lamp corresponding to a direction in which the vehicle exits.

Next, in Step 1025, the CPU determines whether or not the value of the operation completion flag FHO is "1". When the value of the operation completion flag FHO is not "1", the CPU makes a "No" determination in Step 1025, and proceeds to Step 375. In Step 375, the CPU sets the value of the request flag FHS to "0". In addition, in Step 375, the CPU may display on the screen of the touch panel 73 a message notifying that the parking assist control is not started, and cause the speaker 85 to utter the message displayed on the screen. Then, the CPU proceeds to Step 1095, and temporarily ends the present routine. Therefore, the parking assist control is not started.

When the value of the operation completion flag FHO is "1", the CPU makes a "Yes" determination in Step 1025, and executes the subsequent processing of Steps 340 to 375 as described above. Then, the CPU proceeds to Step 1095, and temporarily ends the present routine.

As described above, in the exit-from-parking-space assist, the apparatus of this embodiment can terminate the parking assist control in accordance with a response of the driver with respect to the operation request (whether or not the operation which is requested by the operation request has been performed). In addition, the routines of FIGS. 4 and 5 can be applied to the parking assist control performed in response to the exit-from-parking-space assist request. In this configuration, the processing of Steps 515, 520 and 530 may be omitted. In another example, when the CPU proceeds to Step 515, the CPU may execute the "operation request routine of FIG. 6" to request the driver to perform an "operation of the braking pedal (for example, operation in which the driver presses the braking pedal once)".

The present disclosure is not limited to the embodiments described above, and various modification examples can be adopted within the scope of the present disclosure.

Modification Example 1

The CPU may be configured to monitor whether or not the operation corresponding to the operation request has been performed by the driver in a predetermined period until the number of notifications of the operation request to the driver reaches a predetermined count threshold Th1. In this example, when the operation corresponding to the operation request has not been performed by the driver within the above predetermined period, the CPU terminates (cancels) the parking assist control, and notifies the driver that the parking assist control is terminated.

Figure 11:
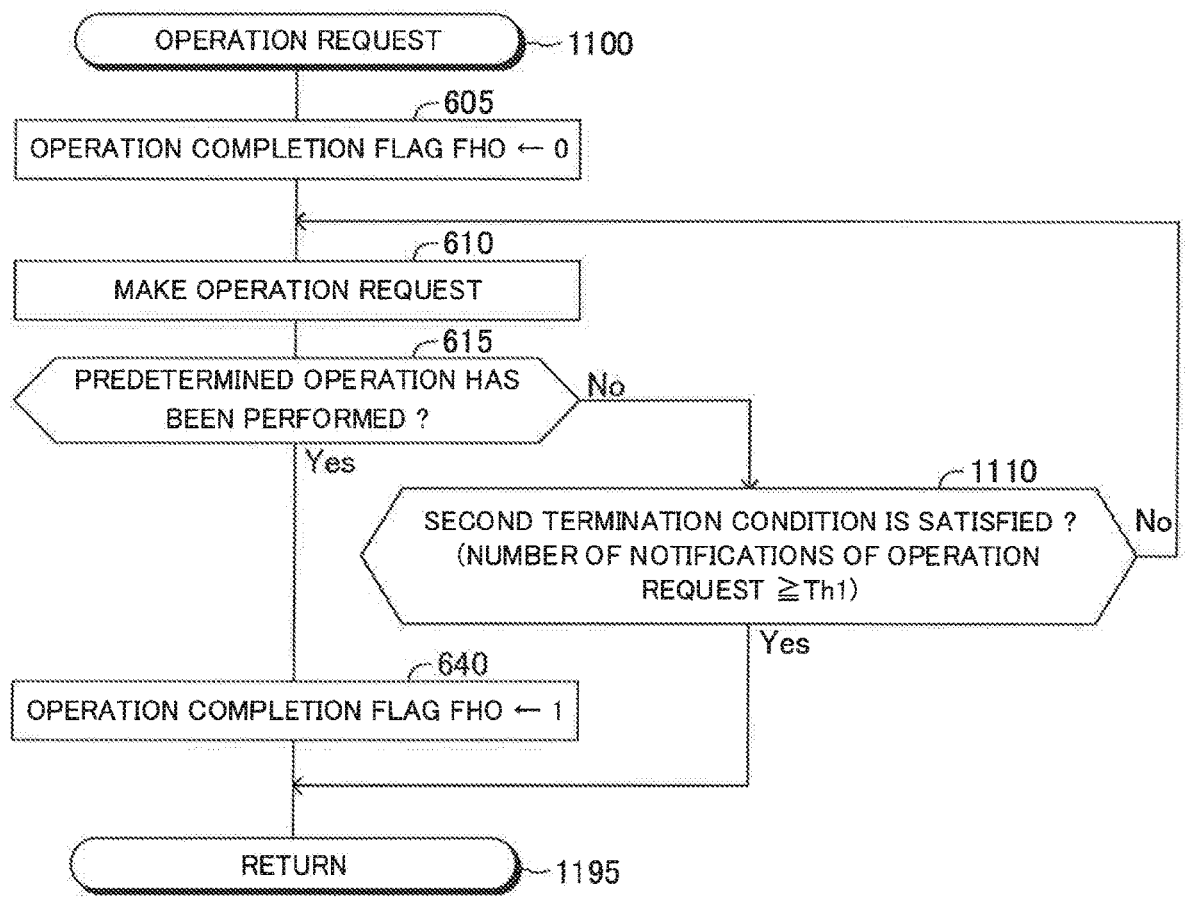
FIG. 11 is a flowchart for illustrating an "operation request routine" to be executed by the CPU of the parking assist ECU in a modification example.

For example, the CPU may execute an "operation request routine of FIG. 11" in place of the routine of FIG. 6. The routine of FIG. 11 is a routine in which Steps 620 to 635 in the routine of FIG. 6 are replaced with Step 1110. In FIG. 11, for each step for executing the same processing as the step shown in FIG. 6, the same reference numeral in FIG. 6 is appended. Therefore, detailed descriptions of Steps in FIG. 11 denoted by the same reference numerals as in FIG. 6 will be omitted.

The CPU starts the routine of FIG. 11 from Step 1100, and proceeds to Step 610 to perform the operation request (that is, notify the driver of a predetermined operation). Next, in Step 615, the CPU determines whether or not the operation corresponding to the operation request has been performed by the driver.

When the operation corresponding to the operation request has not been performed, the CPU makes a "No" determination in Step 615, and proceeds to Step 1110. In Step 1110, the CPU determines whether or not a second predetermined termination condition is satisfied. The second predetermined termination condition is satisfied when the number of notifications of the operation request to the driver becomes equal to or larger than the predetermined count threshold Th1. When the second predetermined termination condition is satisfied, the CPU makes a "Yes" determination in Step 1110, proceeds to Step 1195, and temporarily ends the present routine. On the other hand, when the second predetermined termination condition is not satisfied, the CPU returns to Step 610, and again performs the operation request (that is, again notifies the driver of a predetermined operation).

Modification Example 2

When the parking assist control is terminated (cancelled), the parking assist ECU 10 may execute the following processing for the target region and the target path. Specifically, the parking assist ECU 10 may immediately erase/discard the target region and the target path at the point in time at which the parking assist control is terminated. In another example, the parking assist ECU 10 may maintain (hold) in the RAM "the target region and the target path at the point in time at which the parking assist control is terminated" for a predetermined time period. According to this example, when the driver again operates the parking assist switch 84, the parking assist control is resumed by using the target region and the target path which have been maintained in the RAM.

Modification Example 3

The parking assist switch 84 is only required to be a switch to be operated when the driver requests the parking assist (including the perpendicular-parking assist, the parallel-parking assist and the exit-from-parking-space assist) to generate a signal representing the request. The parking assist switch may be a device configured to recognize a request for the parking assist (including the perpendicular-parking assist, the parallel-parking assist and the exit-from-parking-space assist) by the driver by using a voice recognition device. Such a device is equivalent to a switch to be operated by voice, and may serve as an operation switch (operating device) in one embodiment. The parking assist ECU 10 may include a request monitoring function for determining whether or not the assist request has been issued from a switch operation by the driver and/or the voice of the driver.

Modification Example 4

The above-mentioned notification/alert relating to parking assist may be displayed on the display 51 in place of, or in addition to, the touch panel 73. The meter ECU 50 may display a notification/alert relating to parking assist in accordance with a display command transmitted from the parking assist ECU 10. The display 51 may include a display dedicated to parking assist.

Modification Example 5

The parking assist ECU 10 may also be configured to be able to further execute "forward-perpendicular-parking assist control". The forward-perpendicular-parking assist control is parking assist control in which the own vehicle is parked through only one forward movement and is parked such that the longitudinal direction of the own vehicle and the longitudinal direction of another vehicle are parallel to each other. In this configuration, each time the parking assist switch 84 is pressed, the switch mode is switched among, in order, the reverse-movement-perpendicular-parking mode, the forward-movement-perpendicular-parking mode, the parallel-parking mode, the exit-from-parking-space mode and the unset mode.

What is claimed is:

1. A parking assist apparatus, comprising:
at least one sensor configured to acquire vehicle-surroundings information which is information on surroundings of a vehicle, the vehicle-surroundings information including information on an object present in the surroundings of the vehicle and information on a separation line on a road surface in the surroundings of the vehicle;
an electronic control unit (ECU) including a processor, programmed to:
determine, based on the vehicle-surroundings information, a target region, which is a region in which the vehicle is to occupy when the vehicle completes parking or exiting from a parking space, and determine, as a target path, a path along which the vehicle is to be moved from a position of the vehicle at a current point in time to the target region;
execute parking assist control in such a manner that the vehicle moves the position of the vehicle at the current point in time to the target region along the determined target path, the parking assist control including steering angle automatic control for changing a steering angle of the vehicle, driving force automatic control for controlling a driving force of the vehicle and braking force automatic control for controlling a braking force of the vehicle, wherein, in a period from a first time point on and after a point in time at which the target path has been determined until a second time point on and after a point in time at which the vehicle has reached the target region:
notify an occupant of an operation request requesting a driving operation of the vehicle to be performed by the occupant for the parking assist control;
monitor whether or not the driving operation corresponding to the operation request has been performed by the occupant within a predetermined period after the notification of the operation request; and
when the driving operation corresponding to the operation request has not been performed by the occupant within the predetermined period, terminate the parking assist control and notify the occupant that the parking assist control is terminated.

2. The parking assist apparatus according to claim 1, wherein, in a case where the driving operation corresponding to the operation request has not been performed by the occupant within the predetermined period, the ECU is further programmed to:
when an elapsed time from a point in time at which the occupant is notified of the operation request becomes equal to or longer than a first predetermined time threshold, alert the occupant that the driving operation corresponding to the operation request has not yet been performed without terminating the parking assist control; and
when the elapsed time becomes equal to or longer than a second predetermined time threshold which is longer than the first predetermined time threshold, terminate the parking assist control and notify the occupant that the parking assist control is terminated.

3. The parking assist apparatus according to claim 2, wherein, in a case where there is a stop position for stopping the vehicle in the period from the first time point until the second time point, the ECU is programmed to notify the occupant of a change of a position of a shift lever as the operation request when the vehicle stops at the stop position.

4. The parking assist apparatus according to claim 1, wherein, in a case where there is a stop position for stopping the vehicle in the period from the first time point until the second time point, the ECU is programmed to notify the occupant of a change of a position of a shift lever as the operation request when the vehicle stops at the stop position.

* * * * *